US011907695B2

(12) United States Patent
Gilton

(10) Patent No.: US 11,907,695 B2
(45) Date of Patent: Feb. 20, 2024

(54) DEVICES, SYSTEMS, AND METHODS FOR PROVIDING ON-DEMAND ENGINE SOFTWARE USING A DISTRIBUTED LEDGER

(71) Applicant: General Electric Company, Schenectady, NY (US)

(72) Inventor: Jeffrey Scott Gilton, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 137 days.

(21) Appl. No.: 17/676,943

(22) Filed: Feb. 22, 2022

(65) Prior Publication Data

US 2022/0179630 A1 Jun. 9, 2022

Related U.S. Application Data

(63) Continuation of application No. 16/690,878, filed on Nov. 21, 2019, now Pat. No. 11,288,052.

(51) Int. Cl.
*G06F 8/61* (2018.01)
*B64F 5/40* (2017.01)
(Continued)

(52) U.S. Cl.
CPC .............. *G06F 8/61* (2013.01); *B64D 45/00* (2013.01); *B64F 5/40* (2017.01); *G06F 8/65* (2013.01); *G06F 9/44589* (2013.01)

(58) Field of Classification Search
None
See application file for complete search history.

(56) References Cited

U.S. PATENT DOCUMENTS 9,942,304 B2   4/2018   Gold
10,062,277 B2  8/2018   Furuichi et al.
(Continued)

FOREIGN PATENT DOCUMENTS

CN   104978219 A   10/2015
CN   105957404 A    9/2016
(Continued)

OTHER PUBLICATIONS

Castro, Jaime Marijuán. "Software Asset Management use case for Blockchain." IBM Electronics Industry Blog. IBM, Sep. 30, 2017. https://www.ibm.com/blogs/insights-on-business/electronics/blockchain-for-software-asset-management/.
(Continued)

*Primary Examiner* — Qing Chen
(74) *Attorney, Agent, or Firm* — Dinsmore & Shohl LLP

(57) ABSTRACT

Devices, systems, and methods for providing software to aircraft using a distributed ledger are disclosed. A software delivery system includes aircraft having an engine control system configured to verify and install software utilized by components of the aircraft, an electronic distribution system coupled to the aircraft, an edge manager coupled to the electronic distribution system, and computing devices acting as nodes in a distributed ledger base maintaining a distributed ledger. The electronic distribution system verifies a request for software, requests software, and initiates an installation protocol with the engine control system. The edge manager maintains software. The distributed ledger base is coupled to the aircraft, the electronic distribution system, and the edge manager. The distributed ledger provides a record including information pertaining to a request for software, verifications of the request by the electronic distribution system, the edge manager, and the engine control system, and an installation of the software.

20 Claims, 10 Drawing Sheets

(51) Int. Cl.
   *B64D 45/00* (2006.01)
   *G06F 8/65* (2018.01)
   *G06F 9/445* (2018.01)

(56) References Cited

U.S. PATENT DOCUMENTS

| | | | |
|---|---|---|---|
| 10,361,859 B2 | 7/2019 | Clark et al. | |
| 2009/0198393 A1 | 8/2009 | Sims, III et al. | |
| 2013/0212569 A1* | 8/2013 | Young | G06F 8/61 717/163 |
| 2013/0332011 A1 | 12/2013 | Ziarno | |
| 2016/0098259 A1* | 4/2016 | Mitchell | B64F 5/00 717/175 |
| 2016/0110179 A1* | 4/2016 | Weckesser | G06F 13/4022 710/316 |
| 2016/0117162 A1 | 4/2016 | Searle et al. | |
| 2016/0154642 A1* | 6/2016 | Mason | G06F 8/61 717/172 |
| 2017/0031676 A1 | 2/2017 | Cecchetti et al. | |
| 2017/0214675 A1 | 7/2017 | Johnsrud et al. | |
| 2017/0279774 A1 | 9/2017 | Booz et al. | |
| 2018/0202822 A1 | 7/2018 | DeLizio | |
| 2018/0224353 A1 | 8/2018 | Gyslling et al. | |
| 2018/0270244 A1 | 9/2018 | Kumar et al. | |
| 2018/0341915 A1 | 11/2018 | Narasimhan | |
| 2018/0342036 A1 | 11/2018 | Zachary | |
| 2018/0365265 A1 | 12/2018 | Blanc et al. | |
| 2019/0088047 A1 | 3/2019 | Frewen et al. | |
| 2019/0384587 A1* | 12/2019 | Rao | G06F 21/572 |
| 2019/0394097 A1 | 12/2019 | Ricci | |
| 2020/0184739 A1* | 6/2020 | Nathan | G06Q 10/20 |
| 2020/0202318 A1* | 6/2020 | Rab | H04L 9/0637 |
| 2020/0273268 A1 | 8/2020 | Bhattacharyya et al. | |
| 2020/0380154 A1 | 12/2020 | Jayachandran | |
| 2021/0094700 A1 | 4/2021 | Bergeron | |
| 2021/0342836 A1 | 11/2021 | Cella et al. | |

FOREIGN PATENT DOCUMENTS

| | | |
|---|---|---|
| CN | 108353034 A | 7/2018 |
| CN | 109636547 A | 4/2019 |
| EP | 2945060 A2 | 11/2015 |
| WO | 2017145009 A1 | 8/2017 |
| WO | 2017187397 A1 | 11/2017 |

OTHER PUBLICATIONS

Herbert, Jeff et al. "A Novel Method for Decentralised Peer-to-Peer Software License Validation Using Cryptocurrency Blockchain Technology." 38th Australasian Computer Science Conference (ACSC 2015). CRPIT, 159, Jan. 27, 2015.
Extended European Search Report for European Application No. 20205407.8 dated Apr. 15, 2021, 12 pages.
Ahrash, et al. "Blockchain Model for Enhancing Aircraft Maintenance Records Security". IEEE International Symposium on Technologies for Homeland Security, Nov. 5, 2019, pp. 1-7.
Lessons From The Front Line: The Role of Flight Test In Aircraft Update Programs DJ Hoey 2000.
Beehive: Simple Distributed Programming in Software-defined Networks, author: SH Yeganeh et al., published on 2016.
Title: Blockchain Ready Manufacturing Supply Chain Using Distributed Ledger; author: SA Abeyratne, published on 2016.
Title: Blockchain Based Decentralized Management of Demand Response Programs in Smart Energy Grids; author: C Pop, published on 2018.
Chinese Patent Office Action for Application No. 202011309470.8 dated Sep. 28, 2023 (19 pages with English Translation).

* cited by examiner

DEVICES, SYSTEMS, AND METHODS FOR PROVIDING ON-DEMAND ENGINE SOFTWARE USING A DISTRIBUTED LEDGER

CROSS-REFERENCE TO RELATED APPLICATION

This application is a continuation application of U.S. patent application Ser. No. 16/690,878 (now U.S. Pat. No. 11,288,052) filed on Nov. 21, 2019, which is incorporated herein by reference in its entirety, including the specification, drawings and abstract.

FIELD

The present disclosure relates to devices, systems, and methods for providing on-demand engine software to aircraft engine management systems, and more specifically, for devices, systems, and methods for utilizing a distributed ledger to track and provide software to aircraft engine management systems.

BACKGROUND

Aircraft components, particularly aircraft engines, may incorporate a plurality of sensors that sense various conditions relating to the aircraft components, which are used by software to detect, diagnose, or predict issues and/or faults in real time, even as the aircraft is being operated (e.g., flying). Such software is frequently updated as more information regarding operation of aircraft components is obtained such that the software becomes more accurate in diagnosing or predicting issues and/or faults with each successive update. Further, software is certified with specific functionality and adaptation in service is limited only to engine configuration based on an ID plug, a presence of particular engine hardware, or aircraft on which the engine is installed.

Currently, software updates cannot be pushed to the aircraft (or components thereof) or computer systems communicatively coupled to the aircraft automatically. Rather, software are provided by a manufacturer on a physical medium and is only installed by an operator or a service center upon receiving a corresponding service bulletin and testing the software. As such, the aircraft (or components thereof) does not always have the most up-to-date software installed. In addition, the software has a fixed functionality based on the part to which it is to be applied, and cannot be adapted for use with other parts.

SUMMARY

In a first aspect A1, a software delivery system includes aircraft having an engine control system configured to verify and install one or more software applications utilized by one or more components of the aircraft. The software delivery system further includes an electronic distribution system communicatively coupled to the aircraft. The electronic distribution system verifies a request for a software, requests the software, and initiates an installation protocol with the engine control system. The software delivery system further includes an edge manager communicatively coupled to the electronic distribution system. The edge manager maintains one or more software. The software delivery system further includes a plurality of computing devices acting as nodes of a distributed ledger base, the plurality of computing devices maintain a distributed ledger. The plurality of computing devices are communicatively coupled to the aircraft, the electronic distribution system, and the edge manager. The distributed ledger provides a record including information pertaining to a request for a software, a first verification of the request by the electronic distribution system, a second verification of the request by the edge manager, a third verification of the request by the engine control system, and an installation of the software.

A second aspect A2 includes the software delivery system of first aspect A1, wherein the one or more components of the aircraft are selected from an aircraft control mechanism, an aircraft memory, an aircraft processor, an aircraft system, an aircraft sensor, and an aircraft engine A third aspect A3 includes the software delivery system of any of the first-second aspects A1-A2, wherein the aircraft is communicatively coupled to the electronic distribution system and the distributed ledger base via a ground communication system such that the aircraft maintains communication while flying.

A fourth aspect A4 includes the software delivery system of any of the first-third aspects A1-A3, wherein the engine control system includes one or more of a full authority digital engine control (FADEC) system and a prognostics and health monitoring system.

A fifth aspect A5 includes the software delivery system of any of the first-fourth aspects A1-A4, wherein the software contains programming instructions that, when executed by a processor, cause the processor to receive data from one or more aircraft sensors, determine one or more faults pertaining to the one or more components of the aircraft from the data, and complete one or more processes to address the one or more faults.

A sixth aspect A6 includes the software delivery system of any of the first-fifth aspects A1-A5, wherein the electronic distribution system automatically pushes one or more software updates to the engine control system when the one or more software updates are available via the edge manager.

A seventh aspect A7 includes the software delivery system of any of the first-sixth aspects A1-A6, wherein one or more of the electronic distribution system and the edge manager is a node of the distributed ledger base.

In an eighth aspect A8, a method of providing software to aircraft includes receiving a request for a software via a record generated in a distributed ledger. The record includes information pertaining to the request, information pertaining to an identification of the aircraft, and information pertaining to one or more aircraft systems of the aircraft. The method further includes verifying, by an electronic distribution system, that the software corresponds to the aircraft, modifying, by the electronic distribution system, the record in the distributed ledger with data corresponding to the verification, and requesting, by the electronic distribution system, the software from an edge manager. The record is modified to include a request for the software and is accessible by the edge manager. The method further includes receiving, by the electronic distribution system, the software from the edge manager. The edge manager modifies the record in the distributed ledger to indicate a transmission of the software to the edge distribution system. The method further includes providing, by the electronic distribution system, the software to an engine control system of the aircraft for installation.

A ninth aspect A9 includes the method of the eighth aspect A8, further including receiving an update to the record in the distributed ledger, the update indicating that the software installation is complete.

A tenth aspect A10 includes the method of the ninth aspect A9, wherein receiving the update occurs at the time of completion of the software or when the engine control system establishes a data link with a network after completion of the software installation.

An eleventh aspect A11 includes the method of any of eighth-tenth aspects A8-A10, wherein verifying that the software corresponds to the aircraft includes accessing, by the electronic distribution system, a look-up table that includes a cross reference between the software and one or more of a valid operator, a valid engine model, a valid engine serial number, and a valid time constraint. Verifying further includes determining, by the electronic distribution system, one or more of an operator of the aircraft, an engine model of the aircraft, an engine serial number, and a time at which the record was generated from the information pertaining to the request, the information pertaining to the identification of the aircraft, and the information pertaining to the one or more aircraft systems of the aircraft. Verifying further includes determining, by the electronic distribution system, that the one or more of the operator of the aircraft, the engine model of the aircraft, the engine serial number, and the time at which the record was generated corresponds to the valid operator, the valid engine model, the valid engine serial number, and the valid time constraint. Verifying further includes validating, by the electronic distribution system, the software for use with the aircraft.

A twelfth aspect A12 includes the method of any of eighth-eleventh aspects A8-A11, wherein the information pertaining to the identification of the aircraft includes one or more of an aircraft operator, an aircraft type, an aircraft model number, an aircraft serial number, an aircraft identifier, and a manufacturer of the aircraft.

A thirteenth aspect A13 includes the method of any of eighth-twelfth aspects A8-A12, wherein the information pertaining to one or more aircraft systems of the aircraft includes one or more of, an engine model number, an engine serial number, an engine identifier, an engine manufacturer, a sensor type, and a sensor function.

A fourteenth aspect A14 includes the method of any of eighth-thirteenth aspects A8-A13, wherein the request for the software is provided by an engine manufacturer or an aircraft operator.

A fifteenth aspect A15 includes the method of any of eighth-fourteenth aspects A8-A14, wherein receiving the request for the software includes receiving an automatic notification of a software update from a subscription server.

In a sixteenth aspect A16, a method of providing software to aircraft communicatively coupled in a software delivery system to an electronic distribution system and an edge manager includes receiving a request for a software via a record generated in a distributed ledger. The record includes information pertaining to the request, information pertaining to an identification of the aircraft, and information pertaining to one or more aircraft systems of the aircraft. The method further includes verifying, by the electronic distribution system, that the software corresponds to the aircraft, modifying, by the electronic distribution system, the record in the distributed ledger with first data corresponding to the verification, and requesting, by the electronic distribution system, the software. The record is modified to include a request for the software. The method further includes verifying, by the edge manager, that the request for the software is a valid request, modifying, by the edge manager, the record in the distributed ledger with second data corresponding to the valid request, providing, by the edge manager, the software to the electronic distribution system, initiating, by the electronic distribution system, an installation protocol of the software, verifying, by an engine control system of the aircraft, that the record in the distributed ledger corresponds to the installation protocol, installing, by the engine control system of the aircraft, the software, and modifying, by the engine control system of the aircraft, the record to indicate that the software installation is complete.

A seventeenth aspect A17 includes the method of sixteenth aspect A16, wherein modifying the record includes modifying the record after establishing a data connection between the engine control system and a distributed ledger base storing the distributed ledger.

An eighteenth aspect A18 includes the method of any of sixteenth-seventeenth aspects A16-A17, wherein verifying, by the electronic distribution system, that the software corresponds to the aircraft includes accessing, by the electronic distribution system, a look-up table comprising a cross reference between the software and one or more of a valid operator, a valid engine model, a valid engine serial number, and a valid time constraint. Verifying further includes determining, by the electronic distribution system, one or more of an operator of the aircraft, an engine model of the aircraft, an engine serial number, and a time at which the record was generated from the information pertaining to the request, the information pertaining to the identification of the aircraft, and the information pertaining to the one or more aircraft systems of the aircraft. Verifying further includes determining, by the electronic distribution system, that the one or more of the operator of the aircraft, the engine model of the aircraft, the engine serial number, and the time at which the record was generated corresponds to the valid operator, the valid engine model, the valid engine serial number, and the valid time constraint. Verifying further includes validating, by the electronic distribution system, the software for use with the aircraft.

A nineteenth aspect A19 includes the method of any of sixteenth-eighteenth aspects A16-A18, wherein the request for the software is provided by an engine manufacturer or an aircraft operator.

A twentieth aspect A20 includes the method of any of sixteenth-nineteenth aspects A16-A19, further including, prior to providing by the edge manager, obtaining, by the edge manager, the software from a repository and testing, by the edge manager, the software to ensure the software functions in the aircraft.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
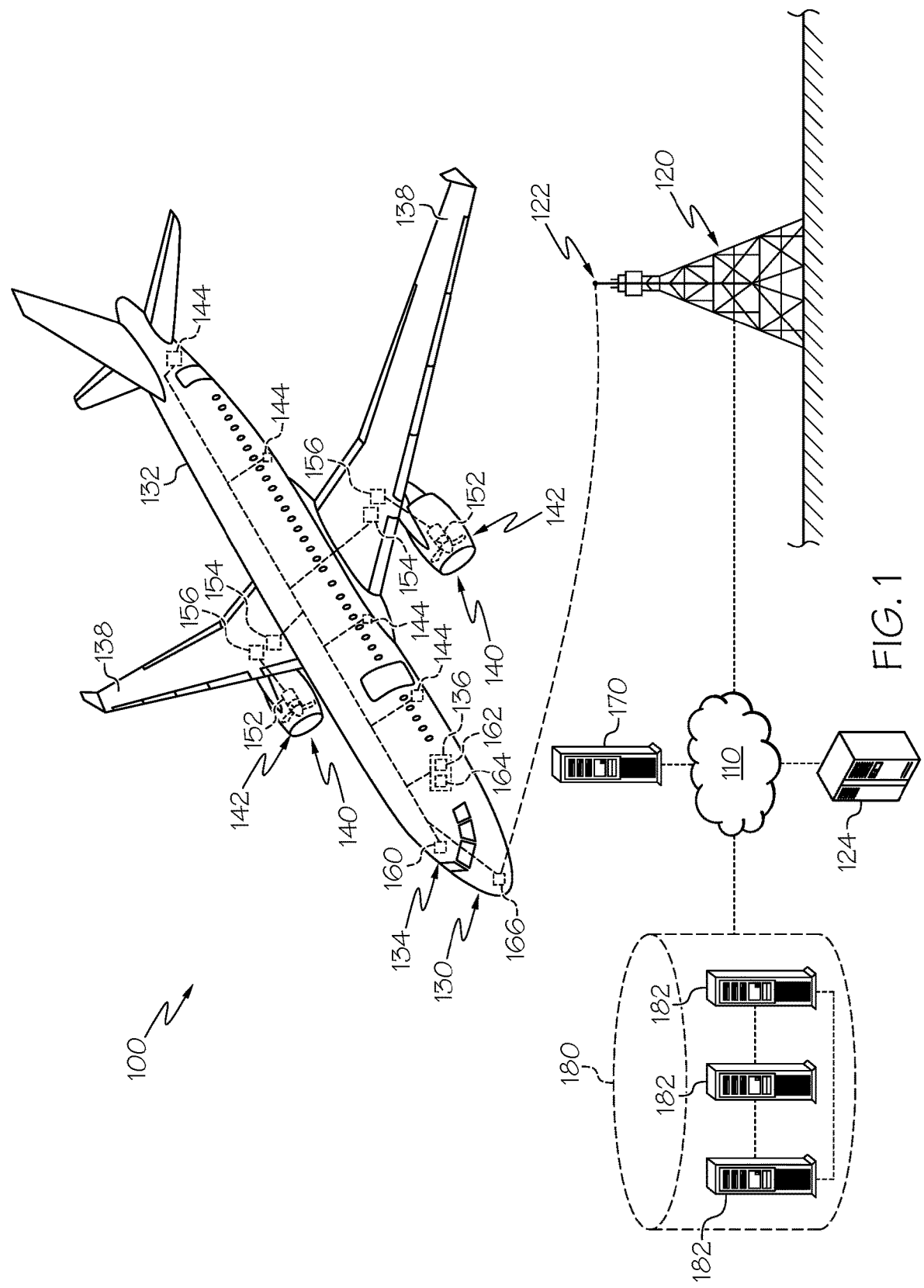
FIG. 1 schematically depicts an illustrative software delivery system according to one or more embodiments shown and described herein.

The present disclosure generally relates to devices, systems, and methods that utilize a distributed ledger, such as a blockchain or the like, for the purposes of providing software and/or software updates to aircraft and/or components thereof. The devices, systems, and methods described herein enable aircraft component (e.g., engine) software functionality on demand, including, but not limited to, on-engine software for advanced engine control or to monitor engine health, and/or off-board diagnostic software. The devices, systems, and methods described herein ensure that the software is compatible with the aircraft components (e.g., an aircraft engine) and that the operator of the aircraft is authorized to use the software. Further, the devices, systems, and methods described herein allow for software to be authorized for use by a specific line-replaceable unit (LRU) on a specific aircraft component serial number.

As noted above, the devices, systems and methods described herein utilize a distributed ledger technology, such as, for example, blockchain technology. Blockchain is a software mechanism that provides a distributed system of trusted assets and transactions without the need for a central trust authority. For use as a distributed ledger, a blockchain may be managed by a peer-to-peer network collectively adhering to a protocol for inter-node communication and validating new blocks. Once recorded, the data in any given block cannot be altered retroactively without alteration of all subsequent blocks, which requires consensus of the network majority. Although blockchain records are not able to be altered, blockchains may be considered secure by design and exemplify a distributed computing system with high Byzantine fault tolerance. Decentralized consensus has therefore been claimed with a blockchain. The devices, systems, and method described herein, which use "smart contracts" based on blockchain technology, enable software that allows an incorporation of functionality in the software that can be unlocked with a subscription key, applications that get downloaded when operators subscribe to them, and advanced diagnostics targeted to specific engines to diagnose problems in the field.

Accordingly, the devices, systems, and methods described herein ensure integrity of distributed software, ensure compatibility of the distributed software with the hardware on which it is to run, ensure an operator is authorized to use the software, and enable subscription-based models.

Previously, engine software distribution models included releasing software as a fixed version, which has been certified for a very specific functionality. As such, adaptation of the software in service is limited to engine configurations that are based on an identification plug (ID plug), a presence of particular engine hardware, and/or particular aircraft on which an engine is installed. Furthermore, software may be assigned a part number, which is identified on an aircraft component part list (e.g., an engine part list). Upgrades to the software are distributed like spare parts in that the distributed software has a fixed functionality based on the part, and is installed from a fixed medium (e.g., a CD, a DVD, a flash drive) by an operator or service center based on a service bulletin. Accordingly the software has a fixed functionality that cannot be changed without distributing a new version.

The previous distributing software process included the following steps. First a Program Control Board (PCB) reviews the design impact and timing of the software and approves a change in design (CID). Then the CID is approved and is issued by an engineering department within a digital workbench. The CID flows to an engineering bill of materials (eBOM) from the digital workbench, and business attributes are assigned by a configuration platform leader (e.g., Ship Code is future, a procurement code is limited, whether shipping is controlled, etc.). In addition, an engineering team assigns an export control classification number (ECCN) to the software part number in the engine component testing (ECT) system (or other aircraft component system). A service bulletin regarding the software is issued by technical publishers, and the issued service bulletin information flows to the eBOM. Aviation maintenance professionals can then obtain the software after reading the service bulletin by completing several steps such as requesting the software, obtaining approval, contacting supply chain planners, finding buyers, waiting for physical media to be shipped, and/or the like. As a result, the previous processes are long and unwieldy and require several individuals to work together to obtain the necessary software before it can even be installed.

By incorporating the use of smart contracts based on distributed ledgers (e.g., blockchain technology), the present devices, systems, and methods are able to activate functionality in software, which may already be incorporated in an aircraft hardware component, but inactive until it is enabled or downloaded and run within a container. Primary software (e.g., main engine software) may still be certified and released as an aircraft part. However, the certified software may incorporate features allowing functionality to be modified after the software is installed on the aircraft component (e.g., engine). In some embodiments, the software may be modified to unlock functionality using a subscription key, download additional applications when operators subscribe to such applications, and/or complete advanced diagnostics that are targeted to specific aircraft components to diagnose and/or predict problems in the field.

"Software" as used herein includes machine-readable and/or machine-executable instructions (e.g., "programming instructions"), particularly machine-readable and/or machine-executable instructions that are readable and/or executable by an engine control system or aircraft system. As used herein, "software" also includes information or data that is utilized by a processing device when executing existing machine-readable and/or machine-executable instructions. That is, the existing machine-readable and/or machine-executable instructions instruct a processing device to access a data file for information that guides a particular processing step. The software as described herein may include such a data file, which can be updated as necessary. The software as used herein may include new software that replace old or existing software or new software that supplement old or existing software in some embodiments. In other embodiments, the software as used herein may include an update to an existing software. That is, the update may not be a fully executable software, but rather may include one or more pieces of code that are injected into an existing software to update the software.

FIG. 1 depicts an illustrative software delivery system, generally designated 100, that is used to distribute software to aircraft 130 according to various embodiments. As shown in FIG. 1, the software delivery system 100 generally contains an interconnectivity of components coupled via a network 110, which may include a wide area network, such as the internet, a local area network (LAN), a mobile communications network, a public service telephone network (PSTN) and/or other network and may be configured to electronically connect components. The illustrative components that may be connected via the network 110 include, but are not limited to, a ground system 120 in communication with the aircraft 130 (e.g., via a ground wireless communications link 122 and an aircraft wireless communications link 166), an electronic distribution system 124, an edge manager 170, and/or a distributed ledger base 180.

The aircraft 130 generally includes a fuselage 132, wing assemblies 138, and one or more engines 140. While FIG. 1 depicts the aircraft 130 as being a fixed-wing craft having two wing assemblies 138 with one engine 140 mounted on each wing assembly 138 (two engines 140 total), other configurations are contemplated. For example, other configurations may include more than two wing assemblies 138, more than two engines 140 (e.g., trijets, quadjets, etc.), engines 140 that are not mounted to a wing assembly 138 (e.g., mounted to the fuselage, mounted to the tail, mounted to the nose, etc.), non-fixed wings (e.g., rotary wing aircraft), and/or the like.

As illustrated in FIG. 1, the aircraft 130 may include the engines 140 coupled to the wing assemblies 138 and/or the fuselage 132, a cockpit 134 positioned in the fuselage 132, and the wing assemblies 138 extending outward from the fuselage 132. A control mechanism 160 for controlling the aircraft 130 is included in the cockpit 134 and may be operated by a pilot located therein. It should be understood that the term "control mechanism" as used herein is a general term used to encompass all aircraft control components, particularly those typically found in the cockpit 134.

A plurality of additional aircraft systems 144 that enable proper operation of the aircraft 130 may also be included in the aircraft 130 as well as an engine control system 136, and a communication system having the aircraft wireless communications link 166. The additional aircraft systems 144 may generally be any systems that effect control of one or more components of the aircraft 130, such as, for example, cabin pressure controls, elevator controls, rudder controls, flap controls, spoiler controls, landing gear controls, heat exchanger controls, and/or the like. In some embodiments, the avionics of the aircraft 130 may be encompassed by one or more of the additional aircraft systems 144. The aircraft wireless communications link 166 may generally be any air-to-ground communication system now known or later developed. Illustrative examples of the aircraft wireless communications link 166 include, but are not limited to, a transponder, a very high frequency (VHF) communication system, an aircraft communications addressing and reporting system (ACARS), a controller-pilot data link communications (CPDLC) system, a future air navigation system (FANS), and/or the like. The engine control system 136 may be operably coupled to the plurality of aircraft systems 144 and the engines 140. While the embodiment depicted in FIG. 1 specifically refers to the engine control system 136, it should be understood that other controllers may also be included within the aircraft 130 to control various other aircraft systems 144 that do not specifically relate to the engines 140.

The engine control system 136 generally includes one or more components for controlling each of the engines 140, such as, for example, a diagnostic computer, an engine-related digital electronic unit that is mounted on one or more of the engines 140 or the aircraft 130, and/or the like. The engine control system may also be referred to as a digital engine control system. Illustrative other components within the engine control system that may function with the engine control system 136 and may require software to operate include, but are not limited to, an electronic engine control (EEC), an electronic engine control unit (EECU), a distributed control module (DCM), a digital engine control (DEC), an engine monitoring unit (EMU), and an engine monitoring system (EMSC). The software used by any one of these components may be software that is distributed as described herein The engine control system 136 may also be connected with other controllers of the aircraft 130. In embodiments, the engine control system 136 may include a processor 162 and/or memory 164, including non-transitory memory. In some embodiments, the memory 164 may include random access memory (RAM), read-only memory (ROM), flash memory, or one or more different types of portable electronic memory, such as discs, DVDs, CD-ROMs, or the like, or any suitable combination of these types of memory. The processor 162 may carry out one or more programming instructions stored on the memory 164, thereby causing operation of the engine control system 136. That is, the processor 162 and the memory 164 within the engine control system 136 may be operable to carry out the various processes described herein with respect to the engine control system 136, including operating various components of the aircraft 130 (such as the engine 140 and/or components thereof), monitoring the health of various components of the aircraft 130 (e.g., the engine 140 and/or components thereof), monitoring operation of the aircraft 130 and/or components thereof, installing software, installing software updates, modifying a record in a distributed ledger to indicate that software has been installed, and/or updated, carrying out processes according to installed and/or updated software, and/or the like.

In some embodiments, the engine control system 136 may include a full authority digital engine control (FADEC)

system. Such a FADEC system can include various electronic components, one or more sensors, and/or one or more actuators that control each of the engines 140. In particular embodiments, the FADEC system includes an electronic engine control system (EEC) or engine control unit (ECU), as well as one or more additional components that are configured to control various aspects of performance of the engines 140. The FADEC system generally has full authority over operating parameters of the engines 140 and cannot be manually overridden. A FADEC system generally functions by receiving a plurality of input variables of a current flight condition, including, but not limited to, air density, throttle lever position, engine temperature, engine pressure, and/or the like. The inputs are received, analyzed, and used to determine operating parameters such as, but not limited to, fuel flow, stator vane position, bleed valve position, and/or the like. The FADEC system may also control a start or a restart of the engines 140. The operating parameters of the FADEC can be modified by installing and/or updating software, such as the software that is distributed by the software delivery system 100 described herein. As such, the FADEC can be programmatically controlled to determine engine limitations, receive engine health reports, receive engine maintenance reports and/or the like to undertake certain measures and/or actions in certain conditions.

In some embodiments, the engine control system 136 may include a Prognostics and Health Monitoring (PHM) system. Such a PHM system can include various electronic components, one or more sensors, and/or one or more actuators that monitor one or more engine systems in the aircraft 130. In some embodiments, the PHM system may be used to predict a future performance of a component by assessing an extent of deviation and/or degradation of a system from its expected normal operating conditions. This may be completed by analyzing failure modes, detecting early signs of wear and aging, and detecting fault conditions. Such actions may be data driven, and may be improved by utilizing machine learning or the like to more accurately predict conditions and determine potential faults. As such, software that is implemented by the PHM system may be continuously updated via the systems and methods described herein to cause the PHM system to more accurately sense and predict component performance.

In some embodiments, the engine control system 136 may include one or more programming instructions for diagnosing and/or predicting one or more engine system faults in the aircraft 130. Diagnosed and/or predicted faults may include, but are not limited to, improper operation of components, failure of components, indicators of future failure of components, and/or the like. As used herein, the term diagnosing refers to a determination after the fault has occurred and contrasts with prediction, which refers to a forward looking determination that makes the fault known in advance of when the fault occurs. Along with diagnosing, the engine control system 136 may detect the fault.

The software run by the engine control system 136 (e.g., executed by the processor 162 and stored within the memory 164) may include a computer program product that includes machine-readable media for carrying or having machine-executable instructions or data structures. Such machine-readable media may be any available media, which can be accessed by a general purpose or special purpose computer or other machine with a processor. Generally, such a computer program may include routines, programs, objects, components, data structures, algorithms, and/or the like that have the technical effect of performing particular tasks or implementing particular abstract data types. Machine-executable instructions, associated data structures, and programs represent examples of program code for executing the exchange of information as disclosed herein. Machine-executable instructions may include, for example, instructions and data, which cause a general purpose computer, special purpose computer, or special purpose processing machine to perform a certain function or group of functions. In some embodiments, the computer program product may be provided by a component external to the engine control system 136 and installed for use by the engine control system 136. For example, the computer program product may be provided by the edge manager 170 and/or the electronic distribution system 124, as described in greater detail herein. The computer program product may generally be updatable via a software update that is received from one or more components of the software delivery system 100, such as, for example, the edge manager 170 and/or the electronic distribution system 124, as described in greater detail herein. The software is generally updated by the engine control system 136 by installing the update such that the update supplements and/or overwrites one or more portions of the existing program code for the computer program product. The software update may allow the computer program product to more accurately diagnose and/or predict faults, provide additional functionality not originally offered, and/or the like.

In some embodiments, the engine control system 136, particularly the processor 162 and the memory 164 thereof, may be communicatively coupled to the distributed ledger base 180 (e.g., via the aircraft wireless communications link 166 and the ground wireless communications link 122 of the ground system 120, which is communicatively coupled to the distributed ledger base 180 via the network 110) such that the engine control system 136 can add or modify a record in a distributed ledger stored on the computing devices 182 of the distributed ledger base. In other embodiments, the engine control system 136 may act as a node in the distributed ledger base 180. That is, the engine control system 136, along with the computing devices 182 of the distributed ledger base 180, may contain a copy of the distributed ledger and the records stored thereon, and may function to validate records as they are updated in a manner similar to the computing devices 182 in the distributed ledger base 180.

In embodiments, each of the engines 140 may include a fan 142 and one or more sensors 150 for sensing various characteristics of the fan 142 during operation of the engines 140. Illustrative examples of the one or more sensors 150 include, but are not limited to, a fan speed sensor 152, a temperature sensor 154, and a pressure sensor 156. The fan speed sensor 152 is generally a sensor that measures a rotational speed of the fan 142 within the engine 140. The temperature sensor 154 may be a sensor that measures a fluid temperature within the engine 140 (e.g., an engine air temperature), a temperature of fluid (e.g., air) at an engine intake location, a temperature of fluid (e.g., air) within a compressor, a temperature of fluid (e.g., air) within a turbine, a temperature of fluid (e.g., air) within a combustion chamber, a temperature of fluid (e.g., air) at an engine exhaust location, a temperature of cooling fluids and/or heating fluids used in heat exchangers in or around an engine, and/or the like. The pressure sensor 156 may be a sensor that measures a fluid pressure (e.g., air pressure) in various locations in and/or around the engine 140, such as, for example, a fluid pressure (e.g., air pressure) at an engine intake, a fluid pressure (e.g., air pressure) within a compressor, a fluid pressure (e.g., air pressure) within a turbine, a fluid pressure (e.g., air pressure) within a combustion chamber, a fluid pressure (e.g., air pressure) at an engine exhaust location, and/or the like.

In some embodiments, each of the engines 140 may have a plurality of sensors 150 associated therewith (including one or more fan speed sensors 152, one or more temperature sensors 154, and/or one or more pressure sensors 156). That is, more than one of the same type of sensor 150 may be used to sense characteristics of an engine 140 (e.g., a sensor 150 for each of the different areas of the same engine 140). In some embodiments, one or more of the sensors 150 may be utilized to sense characteristics of more than one of the engines 140 (e.g., a single sensor 150 may be used to sense characteristics of two engines 140). The engines 140 may further include additional components not specifically described herein, and may include one or more additional sensors 150 incorporated with or configured to sense such additional components in some embodiments.

In embodiments, each of the sensors 150 (including, but not limited to, the fan speed sensors 152, the temperature sensors 154, and the pressure sensors 156) may be communicatively coupled to one or more components of the aircraft 130 such that signals and/or data pertaining to one or more sensed characteristics are transmitted from the sensors 150 for the purposes of determining, detecting, and/or predicting a fault, as well as completing one or more other actions in accordance with software that requires sensor information. As indicated by the dashed lines extending between the various sensors 150 (e.g., the fan speed sensors 152, the temperature sensors 154, and the pressure sensors 156) and the aircraft systems 144 and the engine control system 136 in the embodiment depicted in FIG. 1, the various sensors 150 may be communicatively coupled to the aircraft systems 144 and/or the engine control system 136 in some embodiments. As such, the various sensors 150 may be communicatively coupled via wires or wirelessly to the aircraft systems 144 and/or the engine control system 136 to transmit signals and/or data to the aircraft systems 144 and/or the engine control system 136.

It should be understood that the aircraft 130 merely represents one illustrative embodiment that may be configured to implement embodiments or portions of embodiments of the devices, systems, and methods described herein. During operation, the aircraft 130 (such as the engine control system 136 and/or another component) may diagnose or predict a system fault in one or more of the various aircraft systems 144. By way of non-limiting example, while the aircraft 130 is being operated, the control mechanism 160 may be utilized to operate one or more of the aircraft systems 144. Various sensors 150, including, but not limited to, the fan speed sensors 152, the temperature sensors 154, and/or the pressure sensors 156 may output data relevant to various characteristics of the engine 140 and/or the other aircraft systems 144. The engine control system 136 may utilize inputs from the control mechanism 160, the fan speed sensors 152, the temperature sensors 154, the pressure sensors 156, the various aircraft systems 144, one or more database, and/or information from airline control, flight operations, or the like to diagnose, detect, and/or predict faults that airline maintenance crew may be unaware of. Among other things, the engine control system 136 may analyze the data output by the various sensors 150 (e.g., the fan speed sensors 152, the temperature sensors 154, the pressure sensors 156, etc.), over a period of time to determine drifts, trends, steps, or spikes in the operation of the engines 140 and/or the various other aircraft systems 144. The engine control system 136 may also analyze the system data to determine historic pressures, historic temperatures, pressure differences between the plurality of engines 140 on the aircraft 130, temperature differences between the plurality of engines 140 on the aircraft 130, and/or the like, and to diagnose, detect, and/or predict faults in the engines 140 and/or the various other aircraft systems 144 based thereon. Once a fault has been diagnosed, detected, and/or predicted, an indication may be provided on the aircraft 130 and/or at the ground system 120. It is contemplated that the diagnosis, detection, and/or prediction of faults may be completed during pre-flight checks, may be completed during flight, may be completed post flight, or may be completed after a plurality of flights has occurred. The aircraft wireless communications link 166 and the ground wireless communications link 122 may transmit data such that data and/or information pertaining to the fault may be transmitted off the aircraft 130.

While the embodiment of FIG. 1 specifically relates to components within an aircraft 130, the present disclosure is not limited to such. That is, the various components depicted with respect to the aircraft 130 may be incorporated within various other types of craft and may function in a similar manner to deliver and install new software and/or updated software to the engine control system 136 as described herein. For example, the various components described herein with respect to the aircraft 130 may be present in watercraft, spacecraft, and/or the like without departing from the scope of the present disclosure.

Still referring to FIG. 1, the ground system 120 is generally a transmission system located on the ground that is capable of transmitting and/or receiving signals to/from the aircraft 130. That is, the ground system 120 may include a ground wireless communications link 122 that is communicatively coupled to the aircraft wireless communications link 166 wirelessly to transmit and/or receive signals and/or data. In some embodiments, the ground system 120 may be an air traffic control (ATC) tower and/or one or more components or systems thereof. Accordingly, the ground wireless communications link 122 may be a VHF communication system, an ACARS unit, a CPDLC system, FANS, and/or the like. Using the ground system 120 and the ground wireless communications link 122, the various non-aircraft components depicted in the embodiment of FIG. 1 may be communicatively coupled to the aircraft 130, even in instances where the aircraft 130 is airborne and in flight, thereby allowing for on-demand transmission of software and/or software updates whenever such software and/or software updates may be needed. However, it should be understood that the embodiment depicted in FIG. 1 is merely illustrative. In other embodiments, the aircraft 130 may be communicatively coupled to the various other components of the software delivery system 100 when on the ground and physically coupled to one of the components of the software delivery system 100, such as, for example, the edge manager 170 and/or the electronic distribution system 124.

The electronic distribution system 124 is a computing system that receives requests for software, verifies requests, transmits verified requests to other components of the software delivery system 100 (e.g., to the edge manager 170), receives software from other components of the software delivery system 100 (e.g., from the edge manager 170), and provides software to the aircraft 130 and/or components thereof (e.g., the engine control system 136). In some embodiments, the electronic distribution system 124 may be communicatively coupled to the distributed ledger base 180 (including the computing devices 182 thereof) to generate and/or modify records in a distributed ledger, but may not function as a node in the distributed ledger base 180. In other embodiments, the electronic distribution system 124 may be a node of the distributed ledger base in some embodiments. That is, the electronic distribution system 124 may store a copy of a distributed ledger and the various records included therewith, may generate new records for a distributed ledger, may modify records in a distributed ledger, and/or may verify records of a distributed ledger. Various hardware components that allow the electronic distribution system 124 to perform the functionality will be discussed herein with respect to FIGS. 2A-2B.

Still referring to FIG. 1, the edge manager 170 is a computing system or a network of devices that receives requests for software, verifies requests, transmits software to other components of the software delivery system 100 (e.g., the electronic distribution system 124), and/or the like. In some embodiments, the edge manager 170 may be communicatively coupled to the distributed ledger base 180 (including the computing devices 182 thereof) to generate and/or modify records in a distributed ledger, but may not function as a node in the distributed ledger base 180. In other embodiments, the edge manager 170 may be a node of the distributed ledger base in some embodiments. That is, the edge manager 170 may store a copy of a distributed ledger and the various records included therewith, may generate new records for a distributed ledger, may modify records in a distributed ledger, and/or may verify records of a distributed ledger. Various hardware components that allow the edge manager 170 to perform the functionality will be discussed herein with respect to FIGS. 3A-3C.

While FIG. 1 depicts the electronic distribution system 124 and the edge manager 170 as being separate components, this is a nonlimiting example. That is, in other embodiments, a single device may include all of the components (and corresponding functionality) of both the electronic distribution system 124 and the edge manager 170 without departing from the scope of the present disclosure.

Still referring to FIG. 1, the distributed ledger base 180 is a database that is stored on the plurality of computing devices 182. Each one of the plurality of computing devices has a copy of the data that is stored in the distributed ledger base 180. When a distributed ledger in the distributed ledger base 180 is modified (e.g., by creation of a new record, modification of an existing record, and/or deletion of a record), each copy stored on each of the computing devices 182 is also modified accordingly, and each of the computing devices 182 verifies the modification. Thus, the distributed ledger base 180 acts as a peer-to-peer network of the computing devices 182 that adhere to a protocol for inter-node communication and validation of new records that are generated, records that are modified, and/or records that are deleted. Further, each of the computing devices 182, when modifying a record, append the previous version of the record with the new data (e.g., in the case of a blockchain, creating a new block in the chain). It should be understood that in the distributed ledger, data cannot be retroactively altered without alteration of all subsequently created or modified records (e.g., subsequent blocks in the chain), which requires a consensus of a majority of the computing devices 182 in the distributed ledger base 180. In embodiments, the distributed ledger may be managed autonomously by the computing devices 182 in the distributed ledger base 180 by using peer-to-peer functionality and a distributed timestamping server.

Each record in a distributed ledger (e.g., each block in a blockchain) can hold one or more batches of validated transactions that are hashed an encoded into a Merkle tree, in which each subsequent record (child record) of an initial record (parent record) includes a cryptographic hash of labels that appear in the initial record, such that the subsequent records refer back to the initial record. By including the cryptographic hash of the parent record, the parent and child are ranked together. The linked records form a chain (e.g., a blockchain) due to the iterative process of linking. As a result, the iterative process confirms the integrity of previous records (e.g., previous blocks), all the way back to an initial genesis record (e.g., a genesis block).

As noted herein, various other components of the software delivery system 100 may function as nodes within the distributed ledger base 180, thus functioning along with the computing devices 182 to form the distributed ledger. For example, in some embodiments, the engine control system 136 may be a node in the distributed ledger base 180. In some embodiments, the electronic distribution system 124 may be a node in the distributed ledger base 180. In some embodiments, the edge manager 170 may be a node in the distributed ledger base 180. In further embodiments, any combination of the engine control system 136, the electronic distribution system 124, and the edge manager 170 may be one or more nodes in the distributed ledger base 180 in addition to the computing devices 182. In some embodiments, the computing devices 182 may be omitted. Rather, the various components of the software delivery system 100 may comprise the various nodes of the distributed ledger base 180. That is, the engine control system 136 (including a plurality of engine control systems 136 in a plurality of aircraft 130), the electronic distribution system 124, and the edge manager 170 may make up the distributed ledger base 180 for hosting the distributed ledger that is used to distribute software.

The computing devices 182 that make up the distributed ledger base 180 may generally be any networked computing device that contains computer components necessary for the purposes of creating, updating, verifying, and/or storing records in a distributed ledger. As such, the computing devices 182 may each include a processor (or a plurality of processors), one or more memory devices containing programming instructions, one or more data storage devices, communications hardware, and/or the like.

Figure 2A:
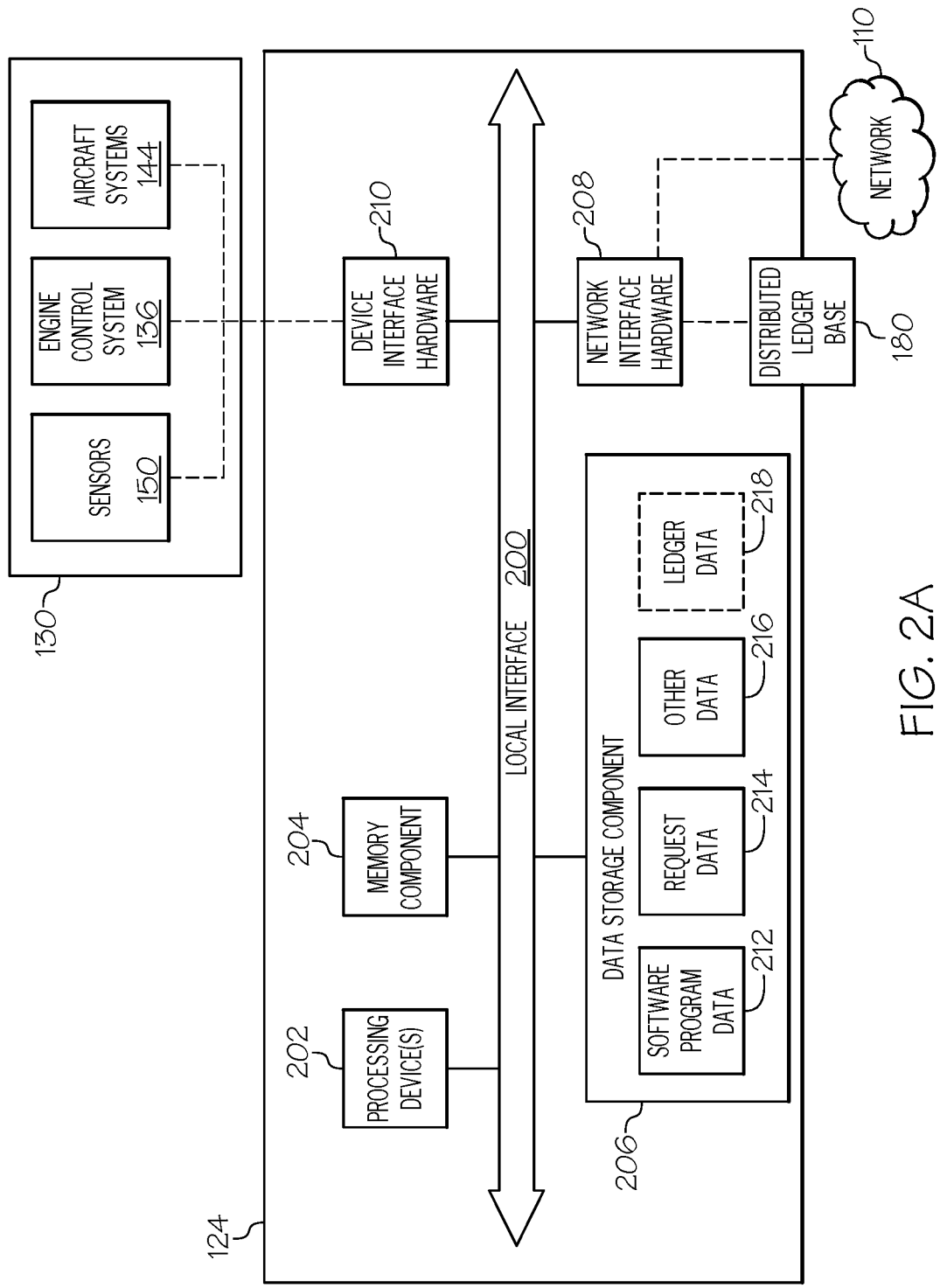
FIG. 2A depicts a block diagram of illustrative internal components of an electronic distribution system according to one or more embodiments shown and described herein.

Turning to FIG. 2A, the various internal components of the electronic distribution system 124 depicted in FIG. 1 are shown. Particularly, FIG. 2A depicts various system components for receiving requests for software, verifying requests, transmitting verified requests, receiving software, and/or providing software.

As illustrated in FIG. 2A, the electronic distribution system 124 may include one or more processing devices 202, a non-transitory memory component 204, network interface hardware 208, device interface hardware 210, and a data storage component 206. A local interface 200, such as a bus or the like, may interconnect the various components.

The one or more processing devices 202, such as a computer processing unit (CPU), may be the central processing unit of the electronic distribution system 124, performing calculations and logic operations to execute a program. The one or more processing devices 202, alone or in conjunction with the other components, are illustrative processing devices, computing devices, processors, or combinations thereof. The one or more processing devices 202 may include any processing component configured to receive and execute instructions (such as from the data storage component 206 and/or the memory component 204).

The memory component 204 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 204 may include one or more programming instructions thereon that, when executed by the one or more processing devices 202, cause the one or more processing devices 202 to complete various processes, such as the processes described herein with respect to FIGS. 4 and 5A-5B.

Figure 2B:
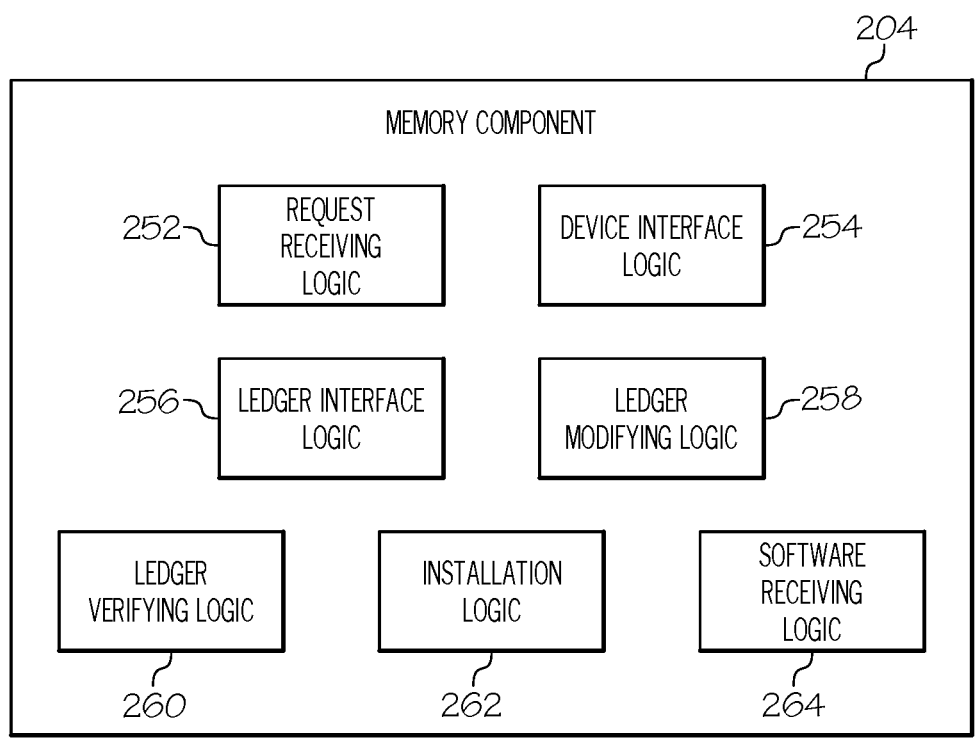
FIG. 2B depicts a block diagram of illustrative logic modules contained within a memory component of the electronic distribution system of FIG. 2A according to one or more embodiments shown and described herein.

Still referring to FIG. 2A, the programming instructions stored on the memory component 204 may be embodied as a plurality of software logic modules, where each logic module provides programming instructions for completing one or more tasks. FIG. 2B depicts the various modules of the memory component 204 of FIG. 2A according to various embodiments.

As shown in FIG. 2B, the memory component 204 includes a plurality of logic modules. Each of the logic modules shown in FIG. 2B may be embodied as a computer program, firmware, or hardware, as an example. Illustrative examples of logic modules present in the memory component 204 include, but are not limited to, request receiving logic 252, device interface logic 254, ledger interface logic 256, ledger modifying logic 258, ledger verifying logic 260, installation logic 262, and/or software receiving logic 264.

Referring to FIGS. 2A and 2B, the request receiving logic 252 may generally include one or more programming instructions for communicating with one or more components outside the electronic distribution system 124 to receive a request for software and/or software update. That is, referring also to FIG. 1, the request receiving logic 252 contains programming for receiving a transmission from the aircraft 130 or component thereof (e.g., the engine control system 136), from the edge manager 170, and/or from one or more external computing devices (not shown), such as, for example, computing devices owned and/or operated by an aircraft manufacturer, an aircraft component manufacturer (e.g., an engine manufacturer), an aircraft operator (e.g., an airline), and/or an aircraft maintenance facility. The various components outside the electronic distribution system 124 generally represent those components that may transmit a request for software for the aircraft 130 (e.g., the engine control system 136 thereof) and/or a request for a software update for the aircraft 130 (e.g., the engine control system 136 thereof).

Referring to FIGS. 1, 2A, and 2B, the device interface logic 254 includes one or more programming instructions for establishing communicative connections with the various devices or components of the software delivery system 100 (FIG. 1) external to the electronic distribution system 124. For example, the device interface logic 254 may include programming instructions usable to establish connections with the aircraft 130 or component thereof (e.g., the engine control system 136), from the edge manager 170, and/or from one or more external computing devices (not shown) in various embodiments. In another example, the device interface logic 254 may contain programming instructions for working in tandem with the programming instructions of the request receiving logic 252, the installation logic 262, and/or the software receiving logic 264 to establish connections with the aircraft 130 or component thereof (e.g., the engine control system 136), from the edge manager 170, and/or from one or more external computing devices (not shown).

Still referring to FIGS. 1, 2A, and 2B, the ledger interface logic 256 includes one or more programming instructions for establishing communicative connections with the one or more computing devices 182 that act as nodes of the distributed ledger base 180. For example, the ledger interface logic 256 may include programming instructions usable to establish connections with the one or more computing devices 182 that act as nodes of the distributed ledger base 180. In embodiments where the electronic distribution system 124 is a node of the distributed ledger base 180, the ledger interface logic 256 may generally include programming instructions in accordance with the established protocols for nodes in the distributed ledger base such that the electronic distribution system 124 can write new records, generate a cryptographic hash to reference existing records (e.g., establish child block(s) associated with a parent block in a blockchain), verify cryptographic hashes that are generated by the one or more computing devices 182, and/or the like.

The ledger modifying logic 258 includes one or more programming instructions for modifying records in a ledger. That is, the ledger modifying logic 258 may include programming instructions for creating a new record (e.g., a genesis block in a blockchain), updating a record (e.g., creating a child block that relates to a parent block in a blockchain), adding information to a record (e.g., appending information to a block in a blockchain), linking records together (e.g., generating cryptographic hashes), and/or the like. In embodiments where the electronic distribution system 124 is not a node of the distributed ledger base 180, the ledger modifying logic 258 may include programming instructions for transmitting instructions to the one or more computing devices 182 to creating a record, updating a record, adding information to a record, linking records, and/or the like. In embodiments where the electronic distribution system 124 is a node of the distributed ledger base 180, the ledger modifying logic 258 may include programming instructions for causing the electronic distribution system 124 to directly create a record, update a record, add information to a record, link records, and/or the like. In some embodiments, the programming instructions of the ledger modifying logic 258 may comply with a protocol established for the peer-to-peer network formed between the computing devices 182 and the electronic distribution system 124 for the purposes of acting as nodes of the distributed ledger base 180.

The ledger verifying logic 260 includes one or more programming instructions for verifying records in a ledger in embodiments where the electronic distribution system 124 is a node of the distributed ledger base 180. That is, the ledger verifying logic 260 may include programming instructions for verifying a record (e.g., verifying creation of a genesis block, creation of a child block, and/or the like in a blockchain), verifying that records are appropriately linked together (e.g., verifying cryptographic hashes), and/or the like. In embodiments where the electronic distribution system 124 is not a node of the distributed ledger base 180, the ledger verifying logic 260 may not be used. In some embodiments, the programming instructions of the ledger verifying logic 260 may comply with a protocol established for the peer-to-peer network formed between the computing devices 182 and the electronic distribution system 124 for the purposes of acting as nodes of the distributed ledger base 180.

Still referring to FIGS. 1 and 2A-2B, the installation logic 262 includes one or more programming instructions for providing software to the aircraft 130 (e.g., the engine control system 136) for the purposes of installing the software. That is, the installation logic 262 may include one or more programming instructions for transmitting an installation file, a plurality of related files necessary (e.g., an installation package), verifying that the software was successfully transmitted (e.g., to avoid corrupted files or the like), and/or the like. In some embodiments, the installation logic 262 may include programming instructions for completing the installation. That is, the installation logic 262 may include programming instructions for unpacking files from an installation package, writing the files to the memory 164, overwriting files, verifying files have been written or overwritten, and/or the like.

The software receiving logic 264 includes one or more programming instructions for receiving software that is to be installed at the aircraft 130 or a component thereof (e.g., the engine control system 136). That is, the software receiving logic 264 may include one or more programming instructions for receiving an installation file, a plurality of related files necessary (e.g., an installation package), verifying that the software was successfully received (e.g., to avoid corrupted files or the like), and/or the like. In some embodiments, the software receiving logic 264 may include programming instructions for connecting to a device containing the software such that the software can be transmitted to the electronic distribution system 124, such as the edge manager 170 or a device (e.g., a storage device or the like) communicatively coupled to the edge manager 170 and configured to transmit software upon receiving a command from the edge manager 170 (e.g., an app store configured to transmit upon receiving a command from the edge manager 170).

Referring again to FIG. 2A, the network interface hardware 208 may include any wired or wireless networking hardware, such as a modem, LAN port, wireless fidelity (Wi-Fi) card, WiMax card, mobile communications hardware, and/or other hardware for communicating with other networks and/or devices. For example, referring to FIGS. 1 and 2A, the network interface hardware 208 may be used to facilitate communication of the electronic distribution system 124 with external storage devices, user computing devices, server computing devices, external control devices, and/or the like via the network 110. In some embodiments, the network interface hardware 208 may include one or more hardware components for facilitating communications with the edge manager 170 and/or the various computing devices 182 of the distributed ledger base 180.

Still referring to FIGS. 1 and 2A, the device interface hardware 210 may communicate information between the local interface 200 and one or more components of the aircraft 130. For example, the device interface hardware 210 may act as an interface between the local interface 200 and the sensors 150, the engine control system 136, the aircraft systems 144, and/or the like. In some embodiments, the device interface hardware 210 may transmit or receive signals and/or data to/from the aircraft 130 and/or one or more components thereof.

Referring again to FIG. 2A, the data storage component 206, which may generally be a storage medium, may contain one or more data repositories for storing data that is received and/or generated. The data storage component 206 may be any physical storage medium, including, but not limited to, a hard disk drive (HDD), memory, removable storage, and/or the like. While the data storage component 206 is depicted as a local device, it should be understood that the data storage component 206 may be a remote storage device, such as, for example, a server computing device, cloud based storage device, or the like. Illustrative data that may be contained within the data storage component 206 includes, but is not limited to, software data 212, request data 214, other data 216 and/or ledger data 218. The software data 212 may generally be data that is stored as a result of distributing software, such as, for example, the files associated with a software, an installer package associated with a software, a link to software stored in other locations, and/or the like. The request data 214 may generally be data pertaining to a request for software, including, but not limited to, data pertaining to a device making the request (e.g., an identification of the device, a location of the device, user login information associated with a user of the device, and/or the like. The other data 216 may generally be any other data that is usable for the purposes of receiving requests for software, verifying requests, verifying authorized devices, receiving software, distributing software, installing software, and/or the like, as described herein. Data that is useable for the purposes of verifying authorized devices may include information pertaining to valid operators, valid engine models, valid engine serial numbers, valid time constraints, and/or the like. In some embodiments, the data may be in the form of a look-up table or the like. Referring again to FIGS. 1 and 2A, the ledger data 218 may be present in embodiments where the electronic distribution system 124 is a node of the distributed ledger base 180. That is, the ledger data 218 may include data that is particular to operation of the electronic distribution system 124 as a node of the distributed ledger base 180. As such, the ledger data 218 may include a copy of one or more distributed ledgers (e.g., blockchains), including each record (e.g., block) stored therein and information pertaining to a connection between records (e.g., a cryptographic hash). In such embodiments, the ledger data 218 may comply with parameters established for distributed storage of a distributed ledger.

It should be understood that the components illustrated in FIGS. 2A-2B are merely illustrative and are not intended to limit the scope of this disclosure. More specifically, while the components in FIGS. 2A-2B are illustrated as residing within the electronic distribution system 124, this is a nonlimiting example. In some embodiments, one or more of the components may reside external to the electronic distribution system 124.

Figure 3A:
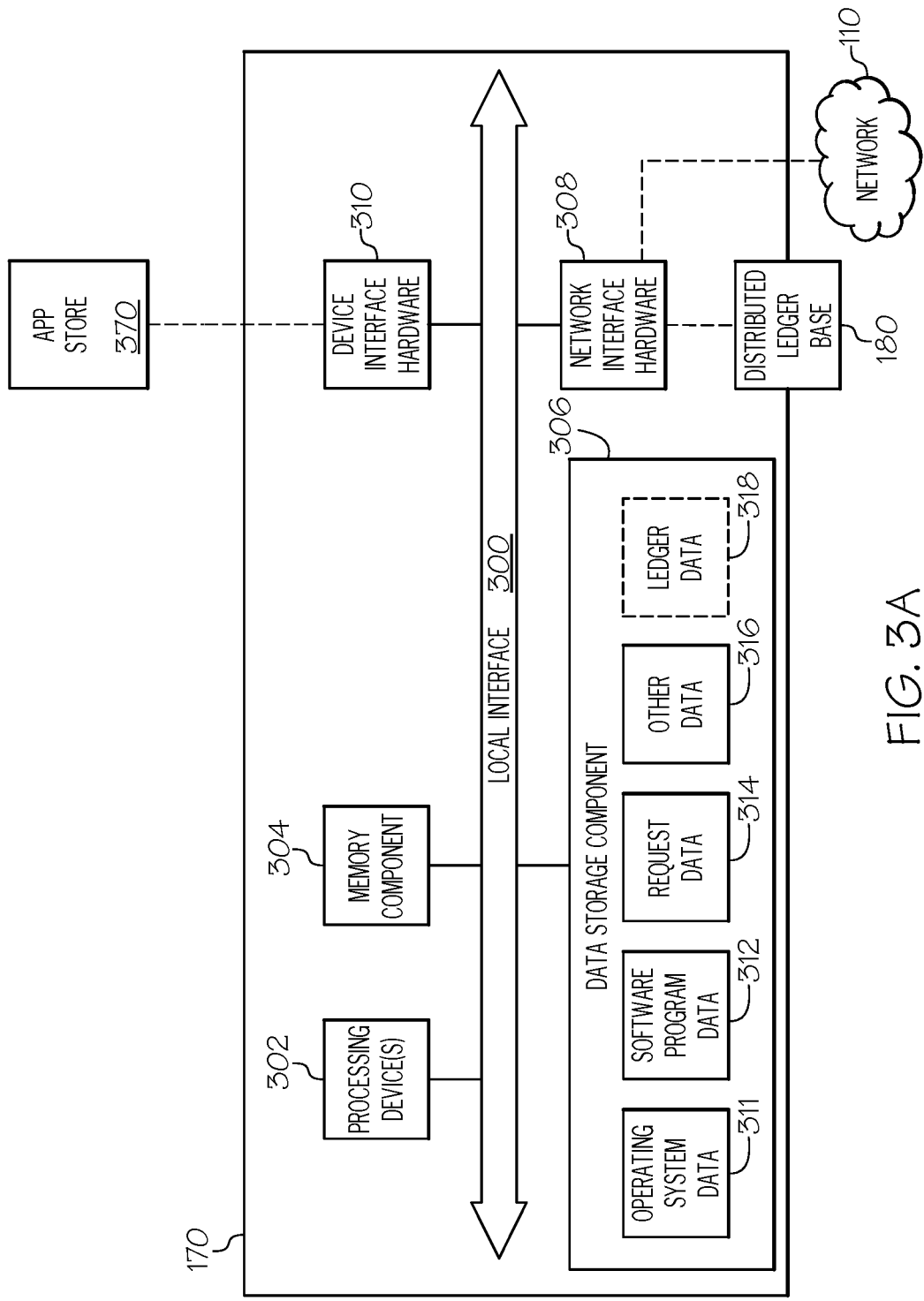
FIG. 3A depicts a block diagram of illustrative internal components of an edge manager according to one or more embodiments shown and described herein.

Turning to FIG. 3A, the various internal components of the edge manager 170 depicted in FIG. 1 are shown. Particularly, FIG. 3A depicts various system components for receiving requests for software, verifying requests, transmitting verified requests, receiving software, and/or providing software.

As illustrated in FIG. 3A, the edge manager 170 may include one or more processing devices 302, a non-transitory memory component 304, network interface hardware 308, device interface hardware 310, and a data storage component 306. A local interface 300, such as a bus or the like, may interconnect the various components.

The one or more processing devices 302, such as a computer processing unit (CPU), may be the central processing unit of the edge manager 170, performing calculations and logic operations to execute a program (e.g., software). The one or more processing devices 302, alone or in conjunction with the other components, are illustrative processing devices, computing devices, processors, or combinations thereof. The one or more processing devices 302 may include any processing component configured to receive and execute instructions (such as from the data storage component 306 and/or the memory component 304).

The memory component 304 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 304 may include one or more programming instructions thereon that, when executed by the one or more processing devices 302, cause the one or more processing devices 302 to complete various processes, such as the processes described herein with respect to FIGS. 4 and 6.

Figure 3B:
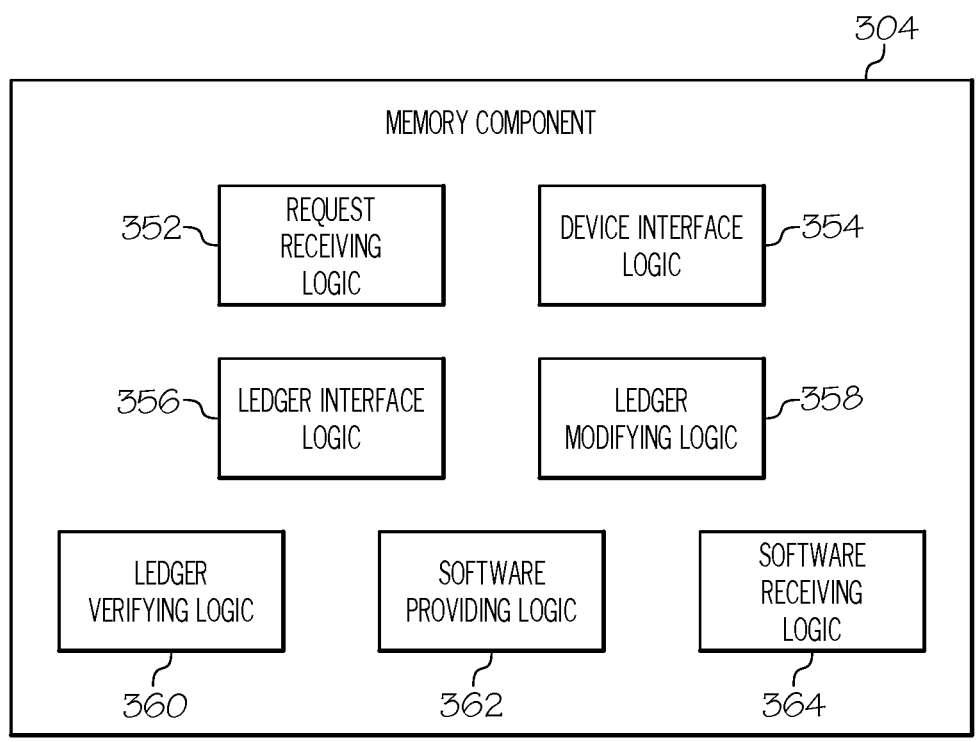
FIG. 3B depicts a block diagram of illustrative logic modules contained within a memory component of the edge manager of FIG. 3A according to one or more embodiments shown and described herein.

Still referring to FIG. 3A, the programming instructions stored on the memory component 304 may be embodied as a plurality of software logic modules, where each logic module provides programming instructions for completing one or more tasks. FIG. 3B depicts the various modules of the memory component 304 of FIG. 3A according to various embodiments.

As shown in FIG. 3B, the memory component 304 includes a plurality of logic modules. Each of the logic modules shown in FIG. 3B may be embodied as a computer program (e.g., software), firmware, or hardware, as an example. Illustrative examples of logic modules present in the memory component 304 include, but are not limited to, request receiving logic 352, device interface logic 354, ledger interface logic 356, ledger modifying logic 358, ledger verifying logic 360, software providing logic 362, and/or software receiving logic 364.

Referring to FIGS. 3A and 3B, the request receiving logic 352 may generally include one or more programming instructions for communicating with one or more components outside the edge manager 170 to receive a request for software and/or software update. That is, referring also to FIG. 1, the request receiving logic 352 contains programming for receiving a transmission from the aircraft 130 or component thereof (e.g., the engine control system 136), and/or from the electronic distribution system 124. The various components outside the edge manager 170 generally represent those components that may transmit a request for software for the aircraft 130 (e.g., the engine control system 136 thereof) and/or a request for a software update for the aircraft 130 (e.g., the engine control system 136 thereof) after an initial verification has been completed by the electronic distribution system 124 as described herein.

Referring to FIGS. 1, 3A, and 3B, the device interface logic 354 includes one or more programming instructions for establishing communicative connections with the various devices or components of the software delivery system 100 (FIG. 1) external to the edge manager 170. For example, the device interface logic 354 may include programming instructions usable to establish connections with the aircraft 130 or component thereof (e.g., the engine control system 136), with the electronic distribution system 124, and/or with one or more external computing devices (not shown) in various embodiments. In another example, the device interface logic 354 may contain programming instructions for working in tandem with the programming instructions of the request receiving logic 352, the software providing logic 362, and/or the software receiving logic 364 to establish connections with the aircraft 130 or component thereof (e.g., the engine control system 136), with the electronic distribution system 124, and/or with one or more external computing devices (not shown).

Still referring to FIGS. 1, 3A, and 3B, the ledger interface logic 356 includes one or more programming instructions for establishing communicative connections with the one or more computing devices 182 that act as nodes of the distributed ledger base 180. For example, the ledger interface logic 356 may include programming instructions usable to establish connections with the one or more computing devices 182 that act as nodes of the distributed ledger base 180. In embodiments where the edge manager 170 is a node of the distributed ledger base 180, the ledger interface logic 356 may generally include programming instructions in accordance with the established protocols for nodes in the distributed ledger base 180 such that the edge manager 170 can write new records, generate a cryptographic hash to reference existing records (e.g., establish child block(s) associated with a parent block in a blockchain), verify cryptographic hashes that are generated by the one or more computing devices 182, and/or the like.

The ledger modifying logic 358 includes one or more programming instructions for modifying records in a ledger. That is, the ledger modifying logic 358 may include programming instructions for creating a new record (e.g., a genesis block in a blockchain), updating a record (e.g., creating a child block that relates to a parent block in a blockchain), adding information to a record (e.g., appending information to a block in a blockchain), linking records together (e.g., generating cryptographic hashes), and/or the like. In embodiments where the edge manager 170 is not a node of the distributed ledger base 180, the ledger modifying logic 358 may include programming instructions for transmitting instructions to the one or more computing devices 182 to creating a record, updating a record, adding information to a record, linking records, and/or the like. In embodiments where the edge manager 170 is a node of the distributed ledger base 180, the ledger modifying logic 358 may include programming instructions for causing the edge manager 170 to directly create a record, update a record, add information to a record, link records, and/or the like. In some embodiments, the programming instructions of the ledger modifying logic 358 may comply with a protocol established for the peer-to-peer network formed between the computing devices 182 and the edge manager 170 for the purposes of acting as nodes of the distributed ledger base 180.

The ledger verifying logic 360 includes one or more programming instructions for verifying records in a ledger in embodiments where the edge manager 170 is a node of the distributed ledger base 180. That is, the ledger verifying logic 360 may include programming instructions for verifying a record (e.g., verifying creation of a genesis block, creation of a child block, and/or the like in a blockchain), verifying that records are appropriately linked together (e.g., verifying cryptographic hashes), and/or the like. In embodiments where the edge manager 170 is not a node of the distributed ledger base 180, the ledger verifying logic 360 may not be used. In some embodiments, the programming instructions of the ledger verifying logic 360 may comply with a protocol established for the peer-to-peer network formed between the computing devices 182 and the edge manager 170 for the purposes of acting as nodes of the distributed ledger base 180.

Still referring to FIGS. 1 and 3A-3B, the software providing logic 362 includes one or more programming instructions for providing software to the electronic distribution system 124 for the purposes of providing to the aircraft 130 (e.g., the engine control system 136) such that the software can be installed. That is, the software providing logic 362 may include one or more programming instructions for transmitting an installation file, a plurality of related files necessary (e.g., an installation package), verifying that the software was successfully transmitted (e.g., to avoid corrupted files or the like), and/or the like.

The software receiving logic 364 includes one or more programming instructions for receiving software that is to be installed at the aircraft 130 or a component thereof (e.g., the engine control system 136). That is, the software receiving logic 364 may include one or more programming instructions for receiving an installation file, a plurality of related files necessary (e.g., an installation package), verifying that the software was successfully received (e.g., to avoid corrupted files or the like), and/or the like. In some embodiments, the software receiving logic 364 may include programming instructions for connecting to a device containing the software such that the software can be transmitted to the electronic distribution system 124, such as a device (e.g., a storage device or the like) communicatively coupled to the edge manager 170. In such embodiments, the device may be an app store 370 or the like, as described herein with respect to FIG. 3C.

Referring again to FIG. 3A, the network interface hardware 308 may include any wired or wireless networking hardware, such as a modem, LAN port, wireless fidelity (Wi-Fi) card, WiMax card, mobile communications hardware, and/or other hardware for communicating with other networks and/or devices. For example, referring to FIGS. 1 and 3A, the network interface hardware 308 may be used to facilitate communication of the edge manager 170 with external storage devices, user computing devices, server computing devices, external control devices, and/or the like via the network 110. In some embodiments, the network interface hardware 308 may include one or more hardware components for facilitating communications with the electronic distribution system 124 and/or the various computing devices 182 of the distributed ledger base 180.

Still referring to FIGS. 1 and 3A, the device interface hardware 310 may communicate information between the local interface 300 and one or more external devices that host the software that are available for installation, such as an app store 370 or the like. For example, the device interface hardware 310 may act as an interface between the local interface 300 and the app store 370. In some embodiments, the device interface hardware 310 may transmit or receive signals and/or data to/from the app store 370. Additional information regarding such communications will be described with respect to FIG. 3C.

Referring again to FIG. 3A, the data storage component 306, which may generally be a storage medium, may contain one or more data repositories for storing data that is received and/or generated. The data storage component 306 may be any physical storage medium, including, but not limited to, a hard disk drive (HDD), memory, removable storage, and/or the like. While the data storage component 306 is depicted as a local device, it should be understood that the data storage component 306 may be a remote storage device, such as, for example, a server computing device, cloud based storage device, or the like. Illustrative data that may be contained within the data storage component 306 includes, but is not limited to, operating system data 311, software data 312, request data 314, other data 316 and/or ledger data 318. The operating system data 311 may generally be data that is generated as a result of operation of the edge manager 170 and/or data that is used for the purposes of operating the edge manager 170. The software data 312 may generally be data that is stored as a result of distributing software, such as, for example, the files associated with a software, an installer package associated with a software, a link to software stored in other locations, and/or the like. The request data 314 may generally be data pertaining to a request for software, including, but not limited to, data pertaining to a device making the request (e.g., an identification of the device, a location of the device, user login information associated with a user of the device, and/or the like. The other data 316 may generally be any other data that is usable for the purposes of receiving requests for software, verifying requests, verifying authorized devices, receiving software, distributing software, installing software, and/or the like, as described herein. Data that is useable for the purposes of verifying authorized devices may include information pertaining to valid operators, valid engine models, valid engine serial numbers, valid time constraints, and/or the like. In some embodiments, the data may be in the form of a look-up table or the like. Referring again to FIGS. 1 and 3A, the ledger data 318 may be present in embodiments where the edge manager 170 is a node of the distributed ledger base 180. That is, the ledger data 318 may include data that is particular to operation of the edge manager 170 as a node of the distributed ledger base 180. As such, the ledger data 318 may include a copy of one or more distributed ledgers (e.g., blockchains), including each record (e.g., block) stored therein and information pertaining to a connection between records (e.g., a cryptographic hash). In such embodiments, the ledger data 318 may comply with parameters established for distributed storage of a distributed ledger.

Figure 3C:
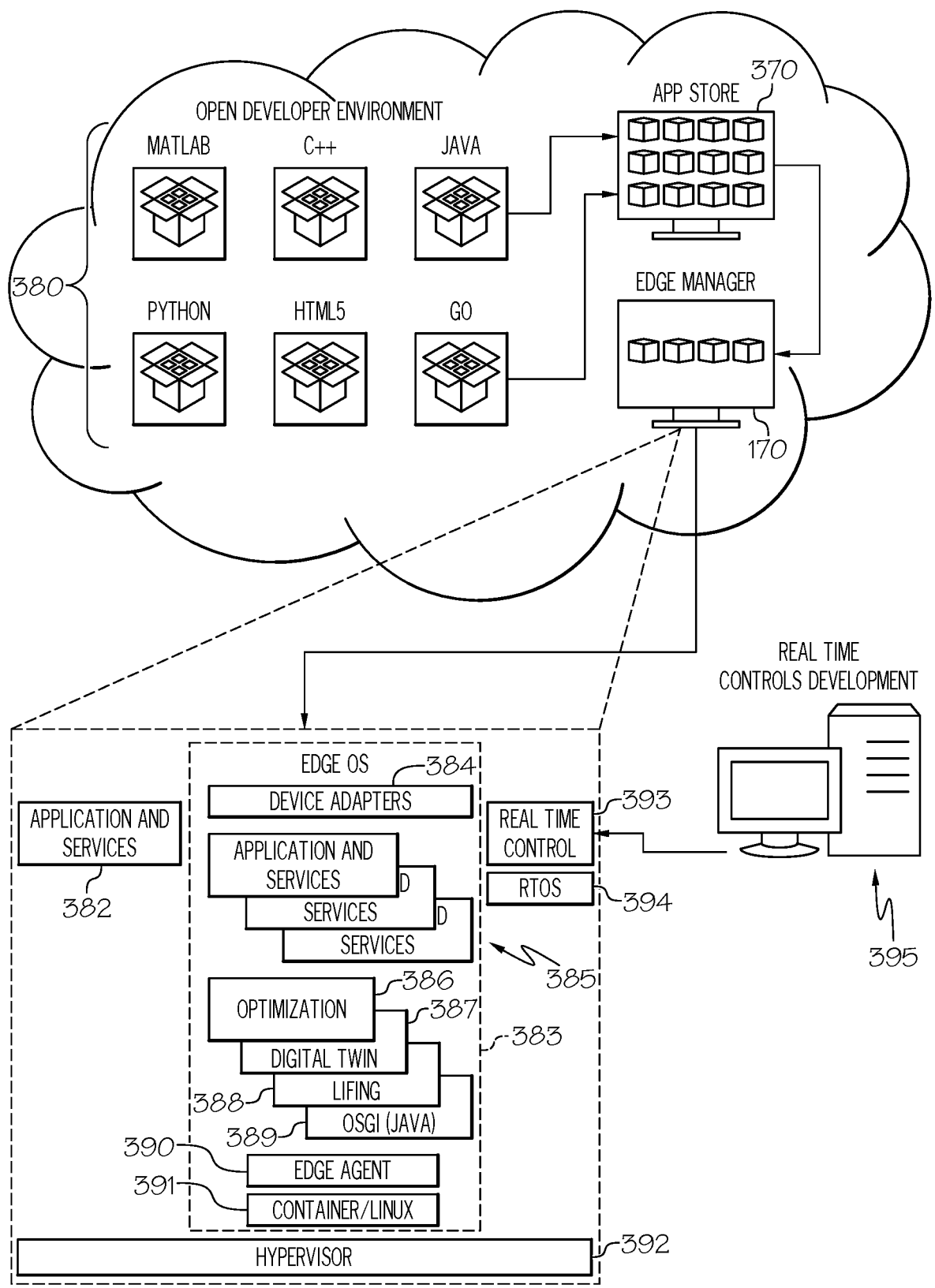
FIG. 3C depicts a block diagram of a software ecosystem of the edge manager of FIG. 3A that is used to distribute software according to one or more embodiments shown and described herein.

FIG. 3C depicts an illustrative software ecosystem that may be present within various components of the edge manager 170, such as, for example, within the data storage component 306 (FIG. 3A), the memory component 304 (FIG. 3A), and/or the like. Referring to FIGS. 3A-3C, the edge manager 170 may be communicatively coupled to the app store 370 or other similar database that contains a plurality of available software applications that can be transmitted by the edge manager 170 to one or more components of the software delivery system 100 (FIG. 1) after receiving a request and completing one or more verification steps, as described herein. The software applications that are available via the app store 370 may be generated, for example, in an open developer environment 380 whereby one or more developers generate the applications and made the applications available via the app store 370.

Still referring to FIGS. 3A-3C, the various components of the edge manager 170, particularly the memory component 304 and/or the data storage component 306 may provide one or more applications, applets, and/or the like that provide the functionality of the edge manager 170 described herein. For example, the edge manager 170 may include an edge operating system (OS) 383 that operates the edge manager 170 and the functionality thereof. The edge OS 383 may be aided by one or more applications and/or services 382, each of the one or more applications and/or services providing a particular functionality to the edge manager 170. Within the edge OS 383, one or more programs, applets, and/or the like may also provide particular functionality to the edge manager 170. Illustrative examples include, but are not limited to, one or more device adaptors 384 that provide programming for connecting to one or more particular devices, one or more applications and/or services 385 that are similar to the applications and/or services 382, an optimization application 386, a digital twin 387 that provides a digital replica of physical assets, lifing software 388 that is particularly used to determine a life of the engine 140 (FIG. 1), open service gateway initiative (OSGi) 389 that provides a Java framework for developing and deploying modular software and libraries, an edge agent 390 that provides a command-line utility for running the edge manager 170, and/or a container 391 providing a secure Linux based system for software to be tested and/or run before distribution. In some embodiments, the edge manager 170 may further include a hypervisor 392, which is a virtual machine monitor (VMM) that creates a virtual machine for the purposes of running a particular software while isolating engine control functionality. In some embodiments, the edge manager 170 may provide real time control software 393 and a real time operating system (RTOS) 394, which can interface with a user computing device 395 to test software response using simulated real time controls, which can further be used to further develop the real time controls to ensure the software functions in a manner that is suited for the aircraft 130 (FIG. 1).

It should be understood that the components illustrated in FIGS. 3A-3C are merely illustrative and are not intended to limit the scope of this disclosure. More specifically, while the components in FIGS. 3A-3C are illustrated as residing within the edge manager 170, this is a nonlimiting example. In some embodiments, one or more of the components may reside external to the edge manager 170.

Figure 4:
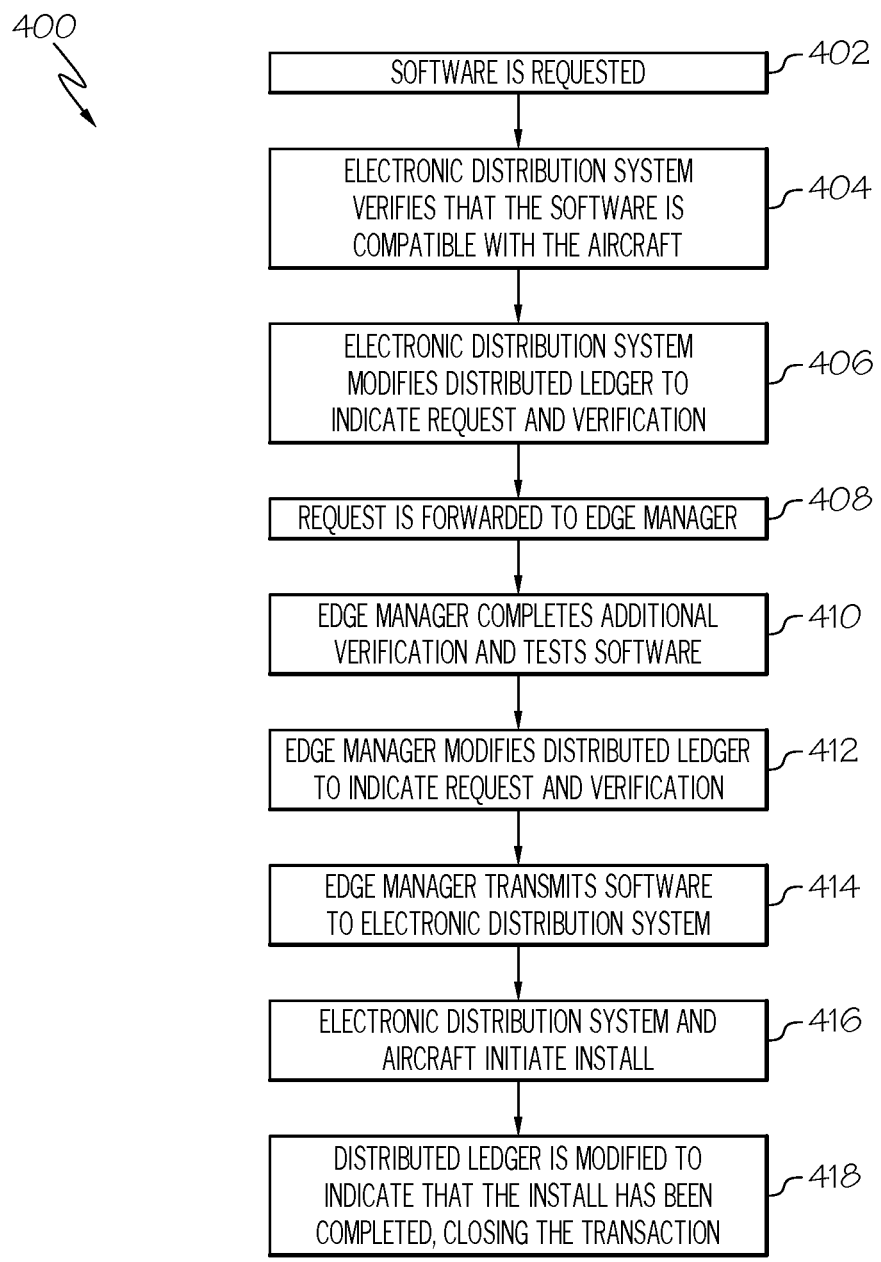
FIG. 4 depicts a flow diagram of an illustrative overview method of distributing a software to aircraft and/or components thereof according to one or more embodiments shown and described herein.

FIG. 4 depicts a flow diagram of an illustrative overview method 400 of providing software to the aircraft 130 (FIG. 1). Referring now to FIGS. 1-4, at block 402, software is requested. In some embodiments, a software request may be received from an operator of the aircraft 130, maintenance crew, a component manufacturer (e.g., a manufacturer of the engines 140), and/or the like. The request may be received from a computing device owned or operated by the requestor (e.g., a user computing device). In some embodiments, the request may be received via one or more of the nodes of the distributed ledger base 180 (e.g., the one or more computing devices 182, the electronic distribution system 124 in some embodiments, and/or the edge manager 170 in some embodiments), which causes a record to be generated in the distributed ledger to begin a transaction (e.g., a genesis block for a transaction). In other embodiments, the request may be received by the electronic distribution system 124, which, in turn generates a record in the distributed ledger corresponding to the request. The request should generally identify the requestor, the software desired, the aircraft 130, the various components of the aircraft 130 (e.g., the engines 140), and/or any other information that may be necessary to determine which software is requested, whether the requestor is authorized to obtain the software, and whether the software is compatible with the aircraft 130 and/or the components thereof (e.g., the engines 140).

At block 404, the electronic distribution system 124 verifies that the software is compatible with the aircraft 130 and/or the various components thereof (e.g., the engines 140). Such a verification generally includes reviewing information pertaining to the request received at block 402 and additional information pertaining to the software, as described in greater detail herein with respect to FIG. 5B.

Still referring to FIG. 4, at block 406, the electronic distribution system 124 modifies the distributed ledger stored on the distributed ledger base 180 to indicate that a request was made (if such a modification was not completed at block 402) and/or that the request was verified according to block 404. That is, the electronic distribution system 124 may generate a record in a distributed ledger, modify a record in a distributed ledger, and/or append a record in a distributed ledger to include information pertaining to the request and/or the verification (including evidence of the verification).

At block 408, the request is forwarded to the edge manager 170. In some embodiments, the request may be forwarded by transmitting data and/or signals from the electronic distribution system 124 to the edge manager 170. In other embodiments, the edge manager 170 may be configured to monitor the distributed ledger base 180 for new records and/or updates to records that are indicative of a request (e.g., after the record is initially written or modified, as described herein).

At block 410, the edge manager 170 may complete an additional verification and may further test the software to ensure the software can be properly installed on the aircraft 130 and/or a component thereof, can be properly run, and/or the like. The edge manager 170 may also verify that the verification step completed according to block 404 is correct in some embodiments. Additional details regarding the verification and testing will be described herein with respect to FIG. 6.

At block 412, the edge manager 170 modifies the distributed ledger to indicate whether the request was verified. Such an indication may occur, for example, by appending a record (e.g., adding another block to the blockchain), modifying a record (e.g., modifying an existing block in the blockchain), generating a new record that references an existing record (e.g., a cryptographic hash), and/or the like. In some embodiments, the software may be locked by the distributed ledger up until this point such that it cannot be transferred to the electronic distribution system 124 and/or the aircraft 130. That is, the modification of the distributed ledger to indicate that the software has been verified to correspond to the aircraft may cause the software to be unlocked for installation. Such a safeguard may avoid instances where the software is sideloaded to the aircraft 130 or a component thereof, thereby bypassing the protocol described herein.

At block 414, the edge manager 170 transmits the software to the electronic distribution system 124. That is, the edge manager 170 may transmit data and/or signals corresponding to the software to the electronic distribution system 124. In some embodiments, the transmission may be recorded as part of the record(s) in the distributed ledger to ensure a record of transmission from the edge manager 170 is maintained, and to maintain an integrity of the software as it is transferred.

The electronic distribution system 124, upon receiving the software, may function with the aircraft 130 to install the software at block 416. In some embodiments, the electronic distribution system 124 may initiate an install by transferring the software or a portion thereof to the aircraft 130 and/or a component thereof, and the aircraft 130 (and/or a component thereof) executes the installation. In other embodiments, the electronic distribution system 124 may install the software directly onto the aircraft 130 or component thereof.

Once the software is installed, the distributed ledger is modified at block 418 to indicate that the installation is complete, thereby closing the transaction. That is, the electronic distribution system 124 and/or the aircraft 130 (or a component thereof such as the engine control system 136) may transmit a signal and/or data to at least one of the computing devices 182 to add a record, modify a record, append a record, and/or the like. Alternatively, the electronic distribution system 124 and/or the aircraft 130 or component thereof (e.g., the engine control system 136) may add a record, modify a record, append a record, and/or the like to close the transaction.

Figure 5A:
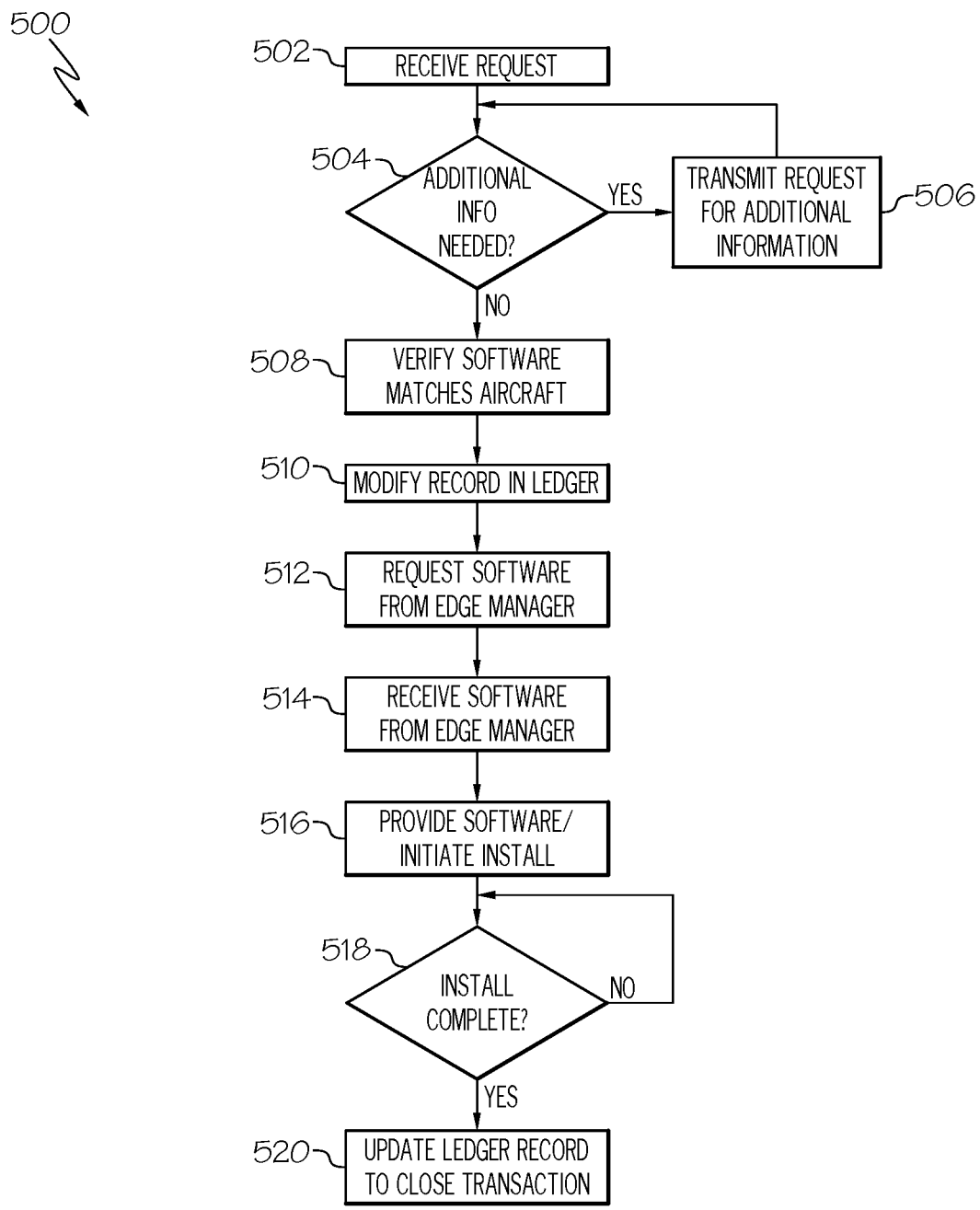
FIG. 5A depicts a flow diagram of an illustrative method completed by an electronic distribution system to distribute a software to aircraft and/or components thereof according to one or more embodiments shown and described herein.
Figure 5B:
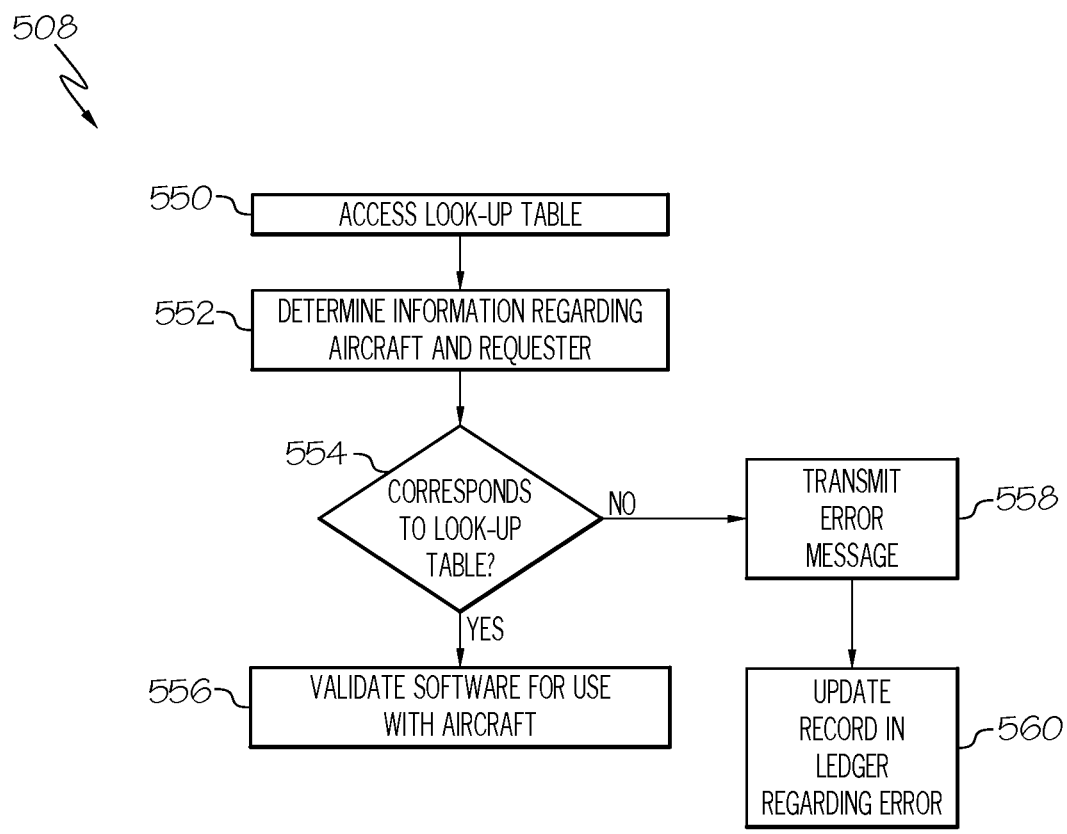
FIG. 5B depicts a flow diagram of an illustrative method of verifying that a software corresponds to an aircraft according to one or more embodiments shown and described herein.

Turning now to FIGS. 5A and 5B, additional details regarding the functionality of the electronic distribution system 124 (FIG. 1) is described. Referring to FIGS. 1 and 5A, a flow diagram of an illustrative method 500 completed by the electronic distribution system 124 to receive a request and distribute the software is depicted. At block 502, software is requested. In some embodiments, a software request may be received from an operator of the aircraft 130, maintenance crew, a component manufacturer (e.g., a manufacturer of the engines 140), and/or the like. The request may be received from a computing device owned or operated by the requestor (e.g., a user computing device). In some embodiments, the request may be received via one or more of the nodes of the distributed ledger base 180 (e.g., the one or more computing devices 182, the electronic distribution system 124 in some embodiments, and/or the edge manager 170 in some embodiments), which causes a record to be generated in the distributed ledger to begin a transaction (e.g., a genesis block for a transaction). In other embodiments, the request may be received by the electronic distribution system 124.

The request should generally identify the requestor, the software desired, the aircraft 130, the various components of the aircraft 130 (e.g., the engines 140), and/or any other information that may be necessary to determine which software is requested, whether the requestor is authorized to obtain the software, and whether the software is compatible with the aircraft 130 and/or the components thereof (e.g., the engines 140). Such information may include, for example, information pertaining to an operator of the aircraft 130, an engine model of the aircraft 130, an engine serial number, and/or the like. As such, a determination is made at block 504 as to whether all of this information is present in the request, or if more information is needed. If more information is needed, the electronic distribution system 124 may transmit a request back for additional information at block 506. That is, the electronic distribution system 124 may transmit the request for additional information directly to the device making the request for the software and/or may update a record in the distributed ledger to indicate that additional information is needed. The process may then repeat at block 504. If no additional information is needed, the process may proceed to block 508.

At block 508, the electronic distribution system 124 verifies that the software is compatible with the aircraft 130 and/or the various components thereof (e.g., the engines 140). Such a verification generally includes reviewing information pertaining to the request received at block 502 and additional information pertaining to the software, such as a stored description of the software, a list of compatible components for which the software functions, a list of approved operators, and/or the like. A comparison can then be made as to whether each piece of obtained information corresponds to the other piece(s) to verify that the software matches the aircraft 130. Additional details regarding the verification are provided in FIG. 5B. Referring to FIGS. 1, 2A, and 5B, the electronic distribution system 124 may access a look-up table or the like stored in a storage device (e.g., the data storage component 206). At block 552, the electronic distribution system 124 may determine at block 552 information regarding the aircraft 130 and the requester. The information may generally be obtained from the request, as described herein. At block 554, a determination may be made as to whether the information regarding the aircraft 130 and the requester corresponds to information in the look-up table corresponding to verified aircraft and/or components thereof and/or requesters. If so, the software may be validated for use with the aircraft 130 at block 556. If not, an error message may be transmitted at block 558 (e.g., to the requester) and the record in the distributed ledger may be updated, appended, and/or the like at block 560.

Referring again to FIGS. 1 and 5A, at block 510, the record in the ledger is modified by the electronic distribution system 124 to indicate that a request was made (if such a modification was not completed at block 402) and/or that the request was verified according to block 404. That is, the electronic distribution system 124 may generate a record in a distributed ledger, modify a record in a distributed ledger, and/or append a record in a distributed ledger to include information pertaining to the request and/or the verification (including evidence of the verification).

At block 512, the software is requested from the edge manager 170. That is, signals and/or data are transmitted by the electronic distribution system 124 to the edge manager 170 to cause the edge manager 170 to complete the various steps of verifying the request, testing the software, and distributing the software, as described herein. In some embodiments, the edge manager 170 may be configured to monitor the distributed ledger base 180 and/or receive a signal from the electronic distribution system 124 to access the distributed ledger base 180 to retrieve the record indicating a request.

Once the edge manager 170 has completed the steps described herein, the electronic distribution system 124 receives the software from the edge manager 170 at block 514. In some embodiments, the electronic distribution system 124 may receive data corresponding to the software. In other embodiments, the electronic distribution system 124 may receive a code or the like (e.g., an installation key, a link to a private server, and/or the like) from the record in the distributed ledger, and may use the code or the like to access the software (e.g., by accessing the link, by entering the installation key, and/or the like).

At block 516, the electronic distribution system 124 provides the software to the aircraft 130 (or a component thereof, such as the engine control system 136) and/or installs the software to the aircraft 130 or a component thereof (e.g., the engine control system 136). In some embodiments, the electronic distribution system 124 may initiate an install by transferring the software or a portion thereof to the aircraft 130 and/or a component thereof, and the aircraft 130 (and/or a component thereof) executes the installation. In other embodiments, the electronic distribution system 124 may install the software directly onto the aircraft 130 or component thereof.

A determination may be made at block 518 as to whether the installation is complete. If not, the process may repeat at block 518 until the installation has been completed. Once completed, the distributed ledger is modified at block 520 to indicate that the installation is complete. That is, the electronic distribution system 124 and/or the aircraft 130 (or a component thereof such as the engine control system 136) may transmit a signal and/or data to at least one of the computing devices 182 to add a record, modify a record, append a record, and/or the like. Alternatively, the electronic distribution system 124 and/or the aircraft 130 or component thereof (e.g., the engine control system 136) may add a record, modify a record, append a record, and/or the like.

Figure 6:
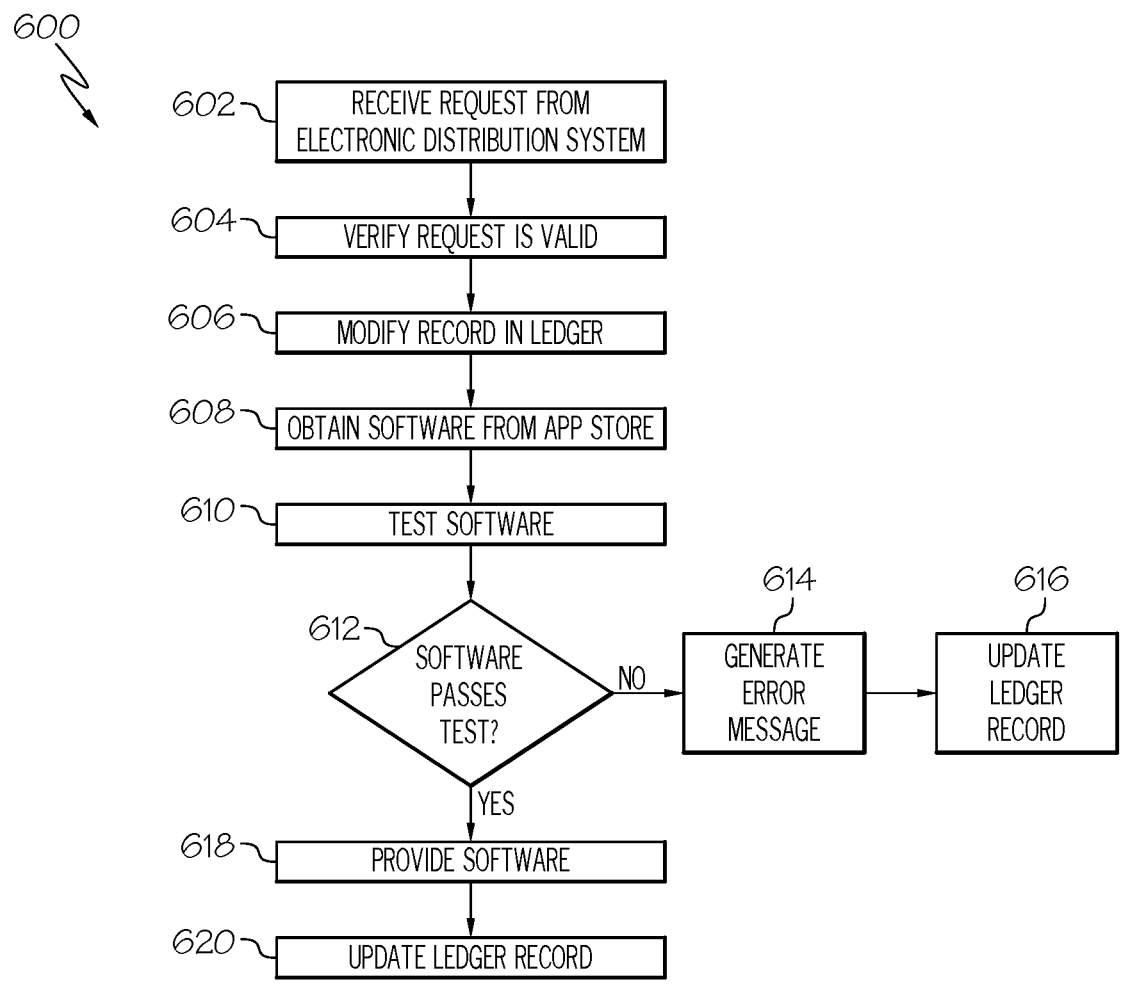
FIG. 6 depicts a flow diagram of an illustrative method completed by an edge manager to retrieve and verify functionality of a software to be installed on aircraft and/or components thereof according to one or more embodiments shown and described herein.

FIG. 6 depicts an illustrative method 600 completed by the edge manager 170 in response to a request for software. Referring to FIGS. 1, 5A, and 6, the request that is provided by the electronic distribution system 124 at block 512 may be received by the edge manager 170 at block 602. That is, the request may be received directly from the electronic distribution system 124 (e.g., via signals and/or data), the distributed ledger base 180 may be monitored for new records, updates to records, and/or record appendixes, and/or the electronic distribution system 124 may transmit a signal to the edge manager 170 to instruct the edge manager 170 to access the distributed ledger base 180 for information pertaining to the request.

At block 604, the edge manager 170 verifies that the request for the software is a valid request. Referring to FIGS. 1, 5A-5B, and 6, such a verification may be similar to the verification completed by the electronic distribution system 124 at blocks 508 and 550-560. That is, the edge manager 170 may independently complete the same steps as the electronic distribution system 124 to ensure the software is usable for the aircraft and/or a component thereof (e.g., the engine control system 136). Once verification has been completed, the edge manager 170 may modify the record in the distributed ledger at block 606 to indicate that verification has been completed. That is, the edge manager 170 may generate a record in a distributed ledger, modify a record in a distributed ledger, and/or append a record in a distributed ledger to include information pertaining to the request and/or the verification (including evidence of the verification).

At block 608, the software may be obtained by the edge manager 170 (e.g., from the app store 370) and tested at block 610. That is, the edge manager 170 may utilize the one or more programs described herein with respect to FIG. 3C to simulate conditions that may occur in the aircraft to ensure the software functions in an appropriate manner. If the software functions appropriately (e.g., passes testing) according to block 612, the process may proceed to block 618. If the software does not function appropriately (e.g., does not pass testing), the process may proceed to block 614.

At block 614, an error message may be generated, and the record in the distributed ledger may updated accordingly at block 616 to indicate that the software has not passed. Such a process ends without the software being provided for installation on the aircraft 130 and/or a component thereof (e.g., the engine control system 136).

At block 618, the software may be provided. In some embodiments, the edge manager 170 may transmit data containing the software directly to the electronic distribution system 124. In other embodiments, the edge manager 170 may update the ledger record (e.g., according to block 620) to provide a link to a server for downloading the software, a passcode that is used to unlock the software, and/or the like. In addition, at block 620, the record on the distributed ledger may further be updated to indicate that the software application has been provided by the edge manager 170.

It should now be understood that that the devices, systems, and methods described herein utilize a distributed ledger, such as a blockchain or the like, for the purposes of providing software and/or software updates to aircraft and/or components thereof. The devices, systems, and methods described herein complete this software distribution in a manner that allows for software applications and/or updates to be supplied automatically and on-demand without any human intervention, but is still completed in a manner to ensure that the software application and/or update is compatible with the aircraft and/or component thereof, has been tested in simulated conditions, and ensures that unauthorized installs of software is avoided.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses.

A software delivery system comprising: aircraft comprising an engine control system configured to verify and install one or more software applications utilized by one or more components of the aircraft; an electronic distribution system communicatively coupled to the aircraft, the electronic distribution system verifying a request for a software, requesting the software, and initiating an installation protocol with the engine control system; an edge manager communicatively coupled to the electronic distribution system, the edge manager maintaining one or more software; and a plurality of computing devices acting as nodes of a distributed ledger base, the plurality of computing devices maintaining a distributed ledger and communicatively coupled to the aircraft, the electronic distribution system, and the edge manager, the distributed ledger providing a record comprising information pertaining to: a request for a software, a first verification of the request by the electronic distribution system, a second verification of the request by the edge manager, a third verification of the request by the engine control system, and an installation of the software.

The software delivery system of any preceding clause, wherein the one or more components of the aircraft are selected from an aircraft control mechanism, an aircraft memory, an aircraft processor, an aircraft system, an aircraft sensor, and an aircraft engine.

The software delivery system of any preceding clause, wherein the aircraft is communicatively coupled to the electronic distribution system and the distributed ledger base via a ground communication system such that the aircraft maintains communication while flying.

The software delivery system of any preceding clause, wherein the engine control system includes one or more of a full authority digital engine control (FADEC) system and a prognostics and health monitoring system.

The software delivery system of any preceding clause, wherein the software contains programming instructions that, when executed by a processor, cause the processor to receive data from one or more aircraft sensors, determine one or more faults pertaining to the one or more components of the aircraft from the data, and complete one or more processes to address the one or more faults.

The software delivery system of any preceding clause, wherein the electronic distribution system automatically pushes one or more software updates to the engine control system when the one or more software updates are available via the edge manager.

The software delivery system of any preceding clause, wherein one or more of the electronic distribution system and the edge manager is a node of the distributed ledger base.

A method of providing software to aircraft, the method comprising: receiving a request for a software via a record generated in a distributed ledger, the record comprising information pertaining to the request, information pertaining to an identification of the aircraft, and information pertaining to one or more aircraft systems of the aircraft; verifying, by an electronic distribution system, that the software corresponds to the aircraft; modifying, by the electronic distribution system, the record in the distributed ledger with data corresponding to the verification; requesting, by the electronic distribution system, the software from an edge manager, wherein the record is modified to include a request for the software and is accessible by the edge manager; receiving, by the electronic distribution system, the software from the edge manager, wherein the edge manager modifies the record in the distributed ledger to indicate a transmission of the software to the edge distribution system; and providing, by the electronic distribution system, the software to an engine control system of the aircraft for installation.

The method of any preceding clause, further comprising: receiving an update to the record in the distributed ledger, the update indicating that the software installation is complete.

The method of any preceding clause, wherein receiving the update occurs at the time of completion of the software or when the engine control system establishes a data link with a network after completion of the software installation.

The method of any preceding clause, wherein verifying that the software corresponds to the aircraft comprises: accessing, by the electronic distribution system, a look-up table comprising a cross reference between the software and one or more of a valid operator, a valid engine model, a valid engine serial number, and a valid time constraint; determining, by the electronic distribution system, one or more of an operator of the aircraft, an engine model of the aircraft, an engine serial number, and a time at which the record was generated from the information pertaining to the request, the information pertaining to the identification of the aircraft, and the information pertaining to the one or more aircraft systems of the aircraft; determining, by the electronic distribution system, that the one or more of the operator of the aircraft, the engine model of the aircraft, the engine serial number, and the time at which the record was generated corresponds to the valid operator, the valid engine model, the valid engine serial number, and the valid time constraint; and validating, by the electronic distribution system, the software for use with the aircraft.

The method of any preceding clause, wherein the information pertaining to the identification of the aircraft includes one or more of an aircraft operator, an aircraft type, an aircraft model number, an aircraft serial number, an aircraft identifier, and a manufacturer of the aircraft.

The method of any preceding clause, wherein the information pertaining to one or more aircraft systems of the aircraft includes one or more of, an engine model number, an engine serial number, an engine identifier, an engine manufacturer, a sensor type, and a sensor function.

The method of any preceding clause, wherein the request for the software is provided by an engine manufacturer or an aircraft operator.

The method of any preceding clause, wherein receiving the request for the software comprises receiving an automatic notification of a software update from a subscription server.

A method of providing software to aircraft communicatively coupled in a software delivery system to an electronic distribution system and an edge manager, the method comprising: receiving a request for a software via a record generated in a distributed ledger, the record comprising information pertaining to the request, information pertaining to an identification of the aircraft, and information pertaining to one or more aircraft systems of the aircraft; verifying, by the electronic distribution system, that the software corresponds to the aircraft; modifying, by the electronic distribution system, the record in the distributed ledger with first data corresponding to the verification; requesting, by the electronic distribution system, the software, wherein the record is modified to include a request for the software; verifying, by the edge manager, that the request for the software is a valid request; modifying, by the edge manager, the record in the distributed ledger with second data corresponding to the valid request; providing, by the edge manager, the software to the electronic distribution system; initiating, by the electronic distribution system, an installation protocol of the software; verifying, by an engine control system of the aircraft, that the record in the distributed ledger corresponds to the installation protocol; installing, by the engine control system of the aircraft, the software; and modifying, by the engine control system of the aircraft, the record to indicate that the software installation is complete.

The method of any preceding clause, wherein modifying the record comprises modifying the record after establishing a data connection between the engine control system and a distributed ledger base storing the distributed ledger.

The method of any preceding clause, wherein verifying, by the electronic distribution system, that the software corresponds to the aircraft comprises: accessing, by the electronic distribution system, a look-up table comprising a cross reference between the software and one or more of a valid operator, a valid engine model, a valid engine serial number, and a valid time constraint; determining, by the electronic distribution system, one or more of an operator of the aircraft, an engine model of the aircraft, an engine serial number, and a time at which the record was generated from the information pertaining to the request, the information pertaining to the identification of the aircraft, and the information pertaining to the one or more aircraft systems of the aircraft; determining, by the electronic distribution system, that the one or more of the operator of the aircraft, the engine model of the aircraft, the engine serial number and the time at which the record was generated corresponds to the valid operator, the valid engine model, the valid engine serial number and the valid time constraint; and validating, by the electronic distribution system, the software for use with the aircraft.

The method of any preceding clause, wherein the request for the software is provided by an engine manufacturer or an aircraft operator.

The method of any preceding clause, further comprising, prior to providing by the edge manager: obtaining, by the edge manager, the software from a repository; and testing, by the edge manager, the software to ensure the software functions in the aircraft.

What is claimed is:

1. A method of providing a software application to an aircraft, the method comprising:
   receiving a request for a software application via a record generated in a distributed ledger, wherein the record generated in the distributed ledger comprises information pertaining to the request for the software application, information pertaining to an identification of the aircraft, and information pertaining to one or more aircraft systems of the aircraft;
   verifying, by an electronic distribution system, that the software application corresponds to the aircraft;
   modifying, by the electronic distribution system, the record generated in the distributed ledger with data corresponding to the verification;
   requesting, by the electronic distribution system, the software application from an edge manager, wherein the record generated in the distributed ledger is modified to include the request for the software application and is accessible by the edge manager;
   receiving, by the electronic distribution system, the software application from the edge manager, wherein the edge manager modifies the record generated in the distributed ledger to indicate a transmission of the software application to the electronic distribution system;

providing, by the electronic distribution system, the software application to an engine control system of the aircraft for installation; and installing, by the electronic distribution system, the software application on the engine control system of the aircraft.

2. The method of claim 1, further comprising:
receiving an update to the record generated in the distributed ledger, wherein the update indicates that the software application installation on the engine control system of the aircraft is complete.

3. The method of claim 2, wherein receiving the update occurs at a time of completion of the software application installation on the engine control system of the aircraft or when the engine control system of the aircraft establishes a data link with a network after completion of the software application installation on the engine control system of the aircraft.

4. The method of claim 1, wherein verifying that the software application corresponds to the aircraft comprises:
accessing, by the electronic distribution system, a look-up table comprising a cross reference between the software application and one or more of a valid operator, a valid engine model, a valid engine serial number, and a valid time constraint;
determining, by the electronic distribution system, one or more of an operator of the aircraft, an engine model of the aircraft, an engine serial number, and a time at which the record was generated in the distributed ledger from the information pertaining to the request for the software application, the information pertaining to the identification of the aircraft, and the information pertaining to the one or more aircraft systems of the aircraft;
determining, by the electronic distribution system, that the one or more of the operator of the aircraft, the engine model of the aircraft, the engine serial number, and the time at which the record was generated in the distributed ledger corresponds to the valid operator, the valid engine model, the valid engine serial number, and the valid time constraint; and
validating, by the electronic distribution system, the software application for use with the aircraft.

5. The method of claim 1, wherein the information pertaining to the identification of the aircraft includes one or more of an aircraft operator, an aircraft type, an aircraft model number, an aircraft serial number, an aircraft identifier, and a manufacturer of the aircraft.

6. The method of claim 1, wherein the information pertaining to the one or more aircraft systems of the aircraft includes one or more of an engine model number, an engine serial number, an engine identifier, an engine manufacturer, a sensor type, and a sensor function.

7. The method of claim 1, wherein the request for the software application is provided by an engine manufacturer or an aircraft operator.

8. The method of claim 1, wherein receiving the request for the software application comprises receiving an automatic notification of a software update from a subscription server.

9. A method of providing a software application to an aircraft communicatively coupled in a software application delivery system to an electronic distribution system and an edge manager, the method comprising:
receiving a request for a software application via a record generated in a distributed ledger, wherein the record generated in the distributed ledger comprises information pertaining to the request for the software application, information pertaining to an identification of the aircraft, and information pertaining to one or more aircraft systems of the aircraft;
verifying, by an electronic distribution system, that the software application corresponds to the aircraft;
modifying, by the electronic distribution system, the record generated in the distributed ledger with first data corresponding to the verification;
requesting, by the electronic distribution system, the software application, wherein the record generated in the distributed ledger is modified to include a request for the software application;
verifying, by the edge manager, that the request for the software application is a valid request;
modifying, by the edge manager, the record generated in the distributed ledger with second data corresponding to the valid request;
providing, by the edge manager, the software application to the electronic distribution system;
initiating, by the electronic distribution system, an installation protocol of the software application;
verifying, by an engine control system of the aircraft, that the record generated in the distributed ledger corresponds to the installation protocol of the software application;
installing, by the engine control system of the aircraft, the software application; and
modifying, by the engine control system of the aircraft, the record generated in the distributed ledger to indicate that the software application installation is complete.

10. The method of claim 9, wherein modifying the record generated in the distributed ledger comprises modifying the record generated in the distributed ledger after establishing a data connection between the engine control system and a distributed ledger base storing the distributed ledger.

11. The method of claim 9, wherein verifying that the software application corresponds to the aircraft comprises:
accessing, by the electronic distribution system, a look-up table comprising a cross reference between the software application and one or more of a valid operator, a valid engine model, a valid engine serial number, and a valid time constraint;
determining, by the electronic distribution system, one or more of an operator of the aircraft, an engine model of the aircraft, an engine serial number, and a time at which the record was generated in the distributed ledger from the information pertaining to the request for the software application, the information pertaining to the identification of the aircraft, and the information pertaining to the one or more aircraft systems of the aircraft;
determining, by the electronic distribution system, that the one or more of the operator of the aircraft, the engine model of the aircraft, the engine serial number, and the time at which the record was generated in the distributed ledger corresponds to the valid operator, the valid engine model, the valid engine serial number, and the valid time constraint; and
validating, by the electronic distribution system, the software application for use with the aircraft.

12. The method of claim 9, wherein the request for the software application is provided by an engine manufacturer or an aircraft operator.

13. The method of claim 9, further comprising, prior to providing, by the edge manager, the software application to the electronic distribution system:
obtaining, by the edge manager, the software application from a repository; and
testing, by the edge manager, the software application to ensure the software application functions in the aircraft.

14. A non-transitory computer-readable storage medium containing program instructions for causing a processor to:
receive a request for a software application via a record generated in a distributed ledger, wherein the record generated in the distributed ledger comprises information pertaining to the request for the software application, information pertaining to an identification of an aircraft, and information pertaining to one or more aircraft systems of the aircraft;
verify, by an electronic distribution system, that the software application corresponds to the aircraft;
modify, by the electronic distribution system, the record generated in the distributed ledger with data corresponding to the verification;
request, by the electronic distribution system, the software application from an edge manager, wherein the record generated in the distributed ledger is modified to include the request for the software application and is accessible by the edge manager;
receive, by the electronic distribution system, the software application from the edge manager, wherein the edge manager modifies the record generated in the distributed ledger to indicate a transmission of the software application to the electronic distribution system;
provide, by the electronic distribution system, the software application to an engine control system of the aircraft for installation; and
install, by the electronic distribution system, the software application on the engine control system of the aircraft.

15. The non-transitory computer-readable storage medium of claim 14, wherein the program instructions further cause the processor to:
receive an update to the record generated in the distributed ledger, wherein the update indicates that the software application installation on the engine control system of the aircraft is complete.

16. The non-transitory computer-readable storage medium of claim 15, wherein the program instructions further cause the processor to receive the update occurs at a time of completion of the software application installation on the engine control system of the aircraft or when the engine control system of the aircraft establishes a data link with a network after completion of the software application installation on the engine control system of the aircraft.

17. The non-transitory computer-readable storage medium of claim 14, wherein the program instructions further cause the processor to verify that the software application corresponds to the aircraft by:
accessing, by the electronic distribution system, a look-up table comprising a cross reference between the software application and one or more of a valid operator, a valid engine model, a valid engine serial number, and a valid time constraint;
determining, by the electronic distribution system, one or more of an operator of the aircraft, an engine model of the aircraft, an engine serial number, and a time at which the record was generated in the distributed ledger from the information pertaining to the request for the software application, the information pertaining to the identification of the aircraft, and the information pertaining to the one or more aircraft systems of the aircraft;
determining, by the electronic distribution system, that the one or more of the operator of the aircraft, the engine model of the aircraft, the engine serial number, and the time at which the record was generated in the distributed ledger corresponds to the valid operator, the valid engine model, the valid engine serial number, and the valid time constraint; and
validating, by the electronic distribution system, the software application for use with the aircraft.

18. The non-transitory computer-readable storage medium of claim 14, wherein the information pertaining to the identification of the aircraft includes one or more of an aircraft operator, an aircraft type, an aircraft model number, an aircraft serial number, an aircraft identifier, and a manufacturer of the aircraft.

19. The non-transitory computer-readable storage medium of claim 14, wherein the information pertaining to the one or more aircraft systems of the aircraft includes one or more of an engine model number, an engine serial number, an engine identifier, an engine manufacturer, a sensor type, and a sensor function.

20. The non-transitory computer-readable storage medium of claim 14, wherein the program instructions further cause the processor to receive the request for the software application by receiving an automatic notification of a software update from a subscription server.

* * * * *